United States Patent
Okada et al.

(10) Patent No.: US 6,924,941 B2
(45) Date of Patent: Aug. 2, 2005

(54) OPTICAL APPARATUS

(75) Inventors: Tadanori Okada, Tochigi (JP); Akihisa Horiuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 65 days.

(21) Appl. No.: 10/371,499

(22) Filed: Feb. 21, 2003

(65) Prior Publication Data

US 2003/0161049 A1 Aug. 28, 2003

(30) Foreign Application Priority Data

Feb. 22, 2002 (JP) .................................... 2002-046506

(51) Int. Cl.⁷ .............................................. G02B 7/09
(52) U.S. Cl. ...................... 359/698; 359/738; 359/740; 396/79
(58) Field of Search .............................. 359/694, 696, 359/697, 698, 738–740; 396/79

(56) References Cited

U.S. PATENT DOCUMENTS

| | | | | |
|---|---|---|---|---|
| 6,046,863 | A | 4/2000 | Chino | 359/697 |
| 6,144,805 | A * | 11/2000 | Ogino | 396/81 |
| 6,292,308 | B1 * | 9/2001 | Tsuzuki et al. | 359/704 |
| 2002/0008772 | A1 * | 1/2002 | Kaneda | 348/370 |
| 2002/0101531 | A1 * | 8/2002 | Kaneda | 348/347 |
| 2002/0118966 | A1 * | 8/2002 | Hofer et al. | 396/79 |
| 2004/0201707 | A1 * | 10/2004 | Noguchi et al. | 348/208.7 |

FOREIGN PATENT DOCUMENTS

| | | |
|---|---|---|
| JP | 11-72691 | 3/1999 |
| JP | 11-289487 | 10/1999 |
| JP | 11-305107 | 11/1999 |

* cited by examiner

*Primary Examiner*—Scott J. Sugarman
*Assistant Examiner*—Deborah Raizen
(74) *Attorney, Agent, or Firm*—Morgan & Finnegan, L.L.P.

(57) ABSTRACT

An optical apparatus is disclosed which comprises an optical system provided with a zoom lens for performing zooming by moving along the optical axis and a focus lens for performing correction and focusing at the time of zooming, an imaging device for imaging an optical image supplied from the optical system, a zoom actuator for driving the zoom lens, a focus actuator for driving the focus lens, a zoom position detecting device for detecting the position of the zoom lens, a focus position detecting device for detecting the position of the focus lens, an aperture stop member whose opening diameter changes so as to adjust the luminous energy passing through the optical system a filter member to be freely inserted into or extracted from the optical path of the optical system, an aperture stop state detecting device for detecting the opening state of the aperture stop member, a filter state detecting device for detecting the insertion state of the filter member, a memory storing the movement information on the relation between the position of the zoom lens for keeping a focused state and the position of the focus lens, and a control device for correcting the movement information in accordance with an output of the aperture stop state detecting device and an output of the filer state detecting device and controlling driving of the focus lens.

18 Claims, 12 Drawing Sheets

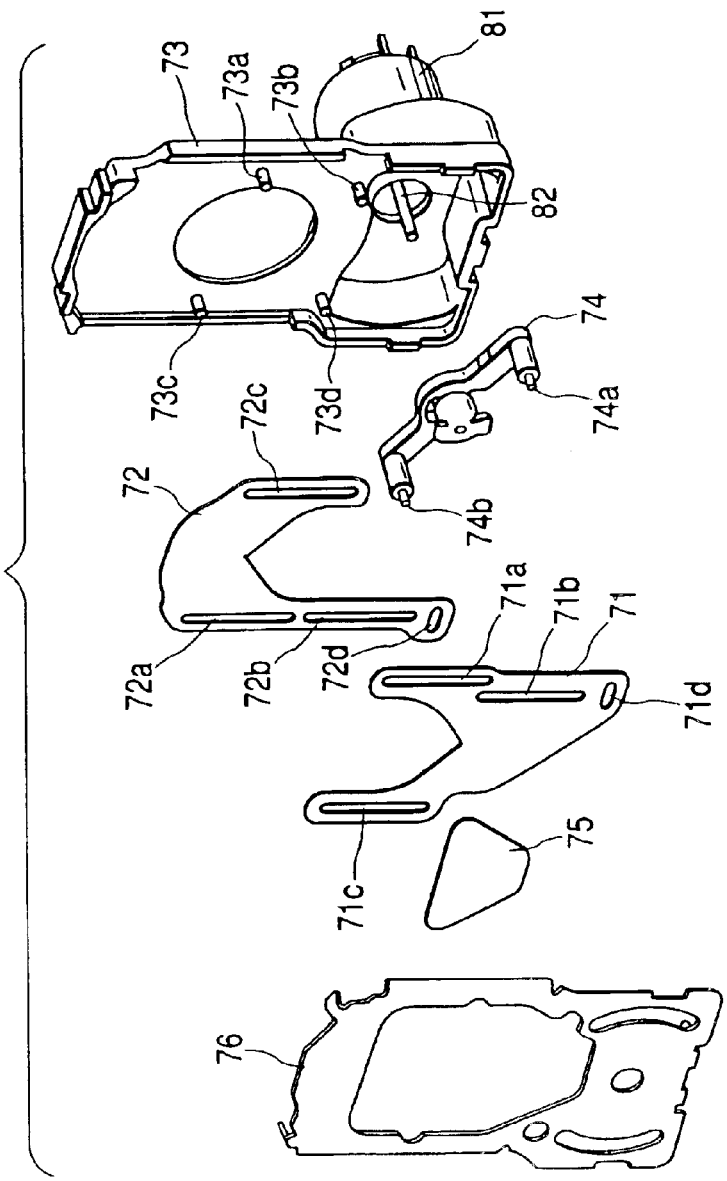
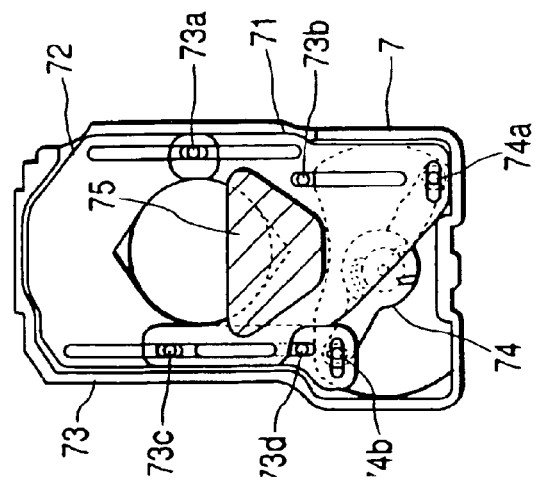

F2.8 FULL OPEN     F4     F5.6

F2.8 FULL OPEN     F4     F5.6

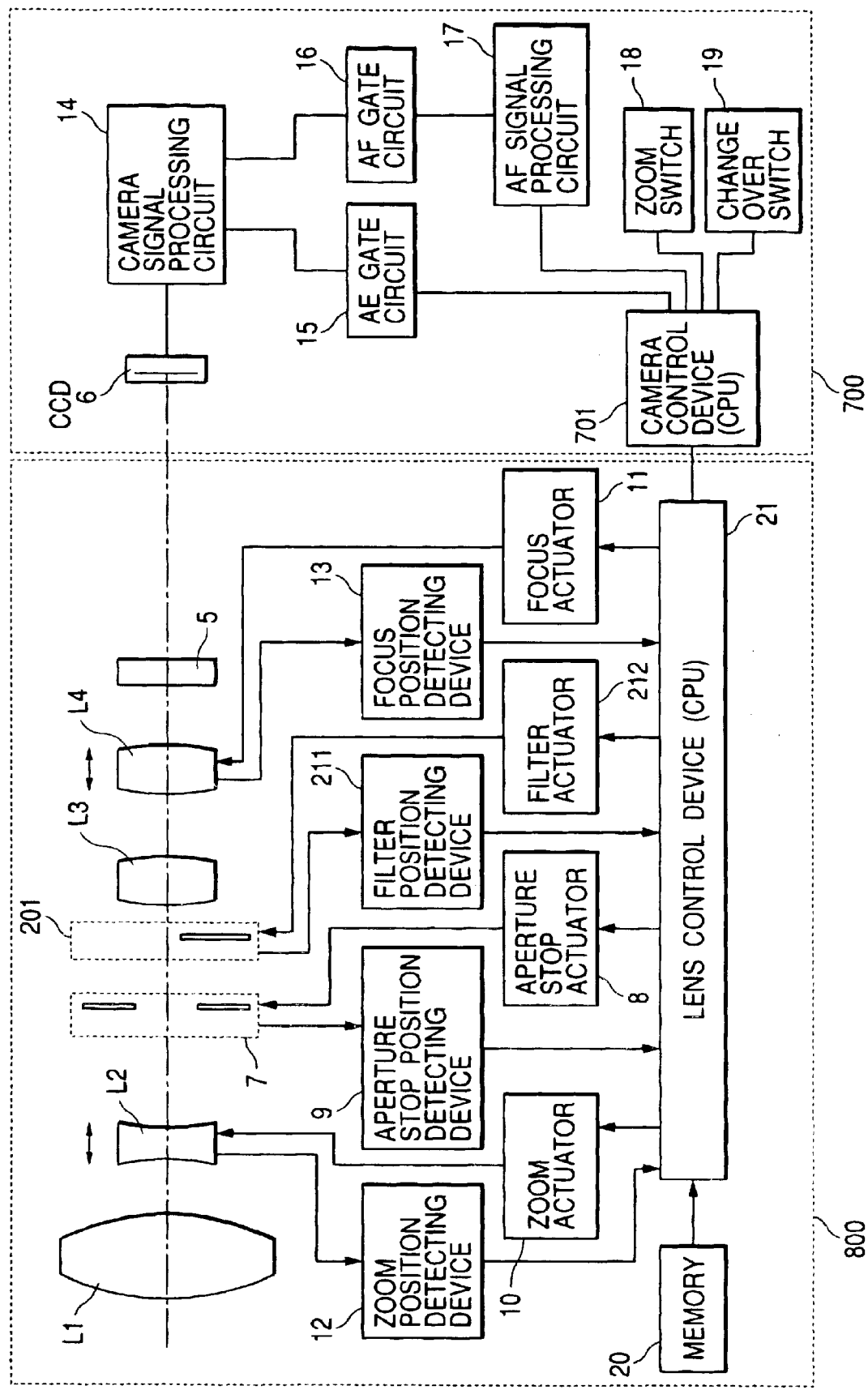

OPTICAL APPARATUS

BACKGROUND OF THE INVENTION

1. Field of the Invention

The present invention relates to an optical apparatus such as a video camera or still camera having a forward/backward movable filter member in an optical path of an image taking optical system.

2. Related Background Art

When image taking an object with a still camera or video camera, if an aperture stop diameter becomes too small though the object is bright, deterioration of image quality due to diffraction and dust image taken due to increase of focal depth become issues. Therefore, to prevent an aperture stop diameter from becoming too small, there are some still cameras or video cameras in which an ND filter is directly set to an aperture stop vane of the aperture stop apparatus of an image taking lens, an aperture stop opening is formed by driving a plurality of aperture stop vanes, and the ND filter integrally set to the aperture stop vane is inserted into the aperture stop opening. Moreover, there are some cameras each of which is provided with an aperture stop apparatus in which an ND filter is forward/backward moved independently of aperture stop vanes of the aperture stop apparatus so that forward/backward movement of the ND filter can be automatically or manually changed.

Furthermore, there are some cameras in each of which the shape of an object can be seen even in nighttime by constituting an infrared cut filter so that it can be inserted or extracted and extracting the infrared cut filter from an optical path to take in a lot of infrared rays when the shape of the object cannot be easily seen in nighttime image taking case.

When inserting an optical member such as an ND filter into the optical path of an image taking optical system, a focus position is displaced depending on the difference of the refraction index of the optical member and the thickness of the member. Moreover, when removing an infrared cut filter normally used for image taking from an optical path, a focus position is displaced. Usually, focusing is instantaneously performed through autofocusing. However, when the brightness of an object is changed under manual focusing and the position of an ND filter in an optical path is changed, the ND filter is manually inserted or extracted, or an aperture stop opens by changing the present mode to the portrait mode, an unfocused image may be obtained because a filter insertion state is changed.

According to decrease in size of cameras and improve of an image quality in recent years, when CCDs are decreased in size and increased in the number of pixels, because of decreasing a pixel pitch, a focus displacement due to the thickness of an ND filter cannot be ignored though the influence of the thickness of the ND filter has not been great so far.

Japanese Patent Application Laid-Open No. 11-289487 discloses a configuration in which an ND filter is set separately from aperture stop vanes of an aperture stop apparatus and the ND filter is inserted or extracted into or from an optical path separately from driving of the aperture stop vanes. Moreover, the configuration is constituted so as to detect the insertion amount of the ND filter into an optical path, drive a focus lens by a correction amount corresponding to the insertion amount, and correct a focus displacement. Furthermore, Japanese Patent Application Laid-Open Nos. 11-72691 and 11-305107 disclose a configuration in which an optical filter is set separately from aperture stop vanes of an aperture stop apparatus to completely insert the optical filter into or completely remove the filter from an optical path separately from driving of the aperture stop vanes. In the disclosed configuration, zoom position detecting means is included to drive a focus lens depending on whether an ND filter or infrared cut filter is present in an optical path and a focus lens is corrected by a correction amount conforming to a zoom position.

In the case of Japanese Patent Application Laid-Open No. 11-289487, though a focus lens correction amount corresponding to an insertion amount of an ND filter is used, there is a problem that an accurate correction amount cannot be obtained by only the insertion amount of the ND filter because the rate of the area covered with the ND filter in the opening area of an optical path depends on an opening diameter of an aperture stop. Moreover, in the case of Japanese Patent Application Laid-Open Nos. 11-72691 and 11-305107, there is a problem that an accurate correction amount cannot be obtained because a state is assumed in which an optical component such as an ND filter completely covers or completely removes from an optical path but image taking when the ND filter half covers the optical path is not considered.

SUMMARY OF THE INVENTION

In view of the above problems, it is an object of the present invention to provide an optical apparatus capable of preferably correcting a focus displacement caused when inserting a filter member such as an ND filter into an optical path, keeping a focused state, and obtaining a high quality image.

To solve the above problems, the present invention provides an optical apparatus comprising an optical system having a zoom lens for zooming an object by moving along an optical axis and a focus lens for performing correction and focus adjustment when an object is zoomed, a zoom actuator for driving the zoom lens, a focus actuator for driving the focus lens, a zooming position detecting device for detecting the position of the zoom lens, a focus position detecting device for detecting the position of the focus lens, a filter member which can be freely inserted into or extracted from the optical path of the optical system so that an insertion state is continuously changed, a filter state detecting device for detecting an insertion state of the filter member, a memory storing movement information on relations between positions of the zoom lens and the focus lens for keeping a focused state when the zoom lens zooms an object and moves, and control device for correcting the movement information in accordance with an output of the filter state detecting device and controlling driving of the focus lens.

In this case, correction of the movement information denotes correction of the position of a focus lens, the correction amount of the position is obtained from a correction value corresponding to the zooming position (magnification changing position) of a zoom lens and a correction coefficient corresponding to an insertion amount (insertion rate) of a filter (corresponding to an insertion rate of the filter into an optical path), these correction value and correction coefficient are previously stored in the above memory or another memory, and a control device obtains a correction amount by reading these pieces of information from the memory. In the case of a correction value corresponding to the zooming position (magnification changing position) of a zoom lens, it is allowed to store correction values at a plurality of typical zooming positions in a memory and use these correction values.

Moreover, the present invention provides an optical apparatus comprising an optical system provided with a zoom lens for zooming an object by moving along an optical axis and a focus lens for performing correction and focusing when zooming an object, an image taking device for image taking an optical image supplied from the optical system, a zoom actuator for driving the zoom lens, a focus actuator for driving the focus lens, a zooming position detecting device for detecting the position of the zoom lens, a focus position detecting device for detecting the position of the focus lens, an aperture stop member for driving a plurality of aperture stop vanes, thereby changing an opening diameter, and changing the luminous energy from the optical system, a filter member for changing the luminous energy passing through the opening, integrally formed on at least one of the aperture stop vanes, an aperture stop state detecting device for detecting the opening state of the aperture stop member, a memory storing the movement information on a relation between the position of the zoom lens and the position of the focus lens which maintain a focused state when the zoom lens zooms an object and moves, and a control device for correcting the movement information in accordance with an output of the aperture stop state detecting device and controlling driving of the focus lens.

In this case, it is preferable to realize a configuration in which the aperture stop member is constituted by a plurality of aperture stop vanes to change an opening diameter (opening area) by relatively moving the aperture stop vanes, the filter member is fixed to at least one of the aperture stop vanes, and an areas to be covered by the filter member is changed in accordance with the relative movement of the aperture stop vanes.

Moreover, in this case, correction of movement information represents correcting the position of a focus lens and the correction amount of the position is obtained from a correction value corresponding to the zooming position (magnification changing position) of a zoom lens and a correction coefficient corresponding to the aperture stop value (F number) of an aperture stop member to which a filter member is integrally set. The correction coefficient corresponding to the aperture stop value (F number) corresponds to the area covered with the filter member with respect to the opening diameter of each aperture stop value because the filter member is integrally provided for the aperture stop vane. Moreover, these correction value and correction coefficient are stored in the above memory or another memory and a control device reads these pieces of information from the memory to obtain a correction amount.

Furthermore, the present invention provides an optical apparatus comprising an optical system provided with a zoom lens for zooming an object by moving along an optical axis and a focus lens for performing correction and focusing when zooming an object, an image taking device for image taking an optical image supplied from the optical system, a zoom actuator for driving the zoom lens, a focus actuator for driving the focus lens, a zooming position detecting device for detecting the position of the zoom lens, a focus position detecting device for detecting the position of the focus lens, an aperture stop member whose opening diameter changes so as to adjust the luminous energy passing through the optical system, a filter member which can be freely inserted into or extracted from the optical path of the optical system, an aperture stop state detecting device for detecting the opening state of the aperture stop member, a filter state detecting device for detecting the insertion state of the filter member, a memory storing the movement information on a relation between the position of the zoom lens and the position of the focus lens which maintain a focused state when the zoom lens zooms an object and moves, and a control device for correcting the movement information in accordance with an output of the aperture stop state detecting device and an output of the filter state detecting device and controlling driving of the focus lens.

Furthermore, the filter member is driven so that an insertion state is continuously changed to the optical path of the optical system and the filter member can be freely inserted into or extracted from the optical path.

In this case, correction of the movement information represents correcting the position of a focus lens and the correction amount of the position is obtained from a correction value corresponding to the zooming position (magnification changing position) of a zoom lens and a correction coefficient corresponding to the insertion amount (insertion rate) of a filter at the aperture stop value (F number) of an aperture stop member (corresponding to the insertion rate of a filter into an optical path at the opening diameter of each aperture stop value). These correction value and correction coefficient are stored in the above memory or another memory and a control device reads these pieces of information from the memory to obtain a correction amount. As a correction value corresponding to the zooming position (magnification changing position) of a zoom lens, it is allowed to use one of correction values at a plurality of typical zooming positions by storing the correction values in a memory.

Moreover, as the above filter member, it is allowed to use a filter member which has a plurality of filters and into or from which one or more filters is or are selectively inserted or extracted and moreover, it is allowed to use a filter member which has a plurality of filters having refraction indexes different from each other and into or from which one or more filters is or are selectively inserted or extracted. In this case, it is also allowed to previously store a correction coefficient corresponding to each filter in the above memory or another memory, detect the insertion of a filter to be selectively inserted into an optical path into the optical path by an optical sensor, magnetic sensor, or an electric switch, read a correction coefficient corresponding to the detected filter from the memory by a control device, and obtain a correction amount.

Furthermore, the present invention provides an optical apparatus comprising an optical system provided with a focus lens such as a monofocal lens, an image taking device for image taking an optical image supplied from the optical system, a focus actuator for driving the focus lens, a focus position detecting device for detecting the position of the focus lens, an aperture stop member for driving a plurality of aperture stop vanes, changing an opening diameter, and changing luminous energy from the optical system, a filter member provided for at least one of the aperture stop vanes to change the luminous energy passing through the opening, an aperture stop state detecting device for detecting the opening state of the aperture stop member, and a control device for controlling driving of the focus lens so as to correct the position of the focus lens in accordance with an output of the aperture stop state detecting device.

In this case, it is preferable that the aperture stop member is constituted by a plurality of aperture stop vanes to change an opening diameter (opening area) by relatively moving the aperture stop vanes and the filter member is constituted so that it is fixed to at least one of the aperture stop vanes and an area covered with the filter member to the opening diameter is changed in accordance with relative movement of the aperture stop vanes.

Moreover, in this case, the correction amount of the position of the focus lens is obtained from a preset correction value (movement correction amount of the focus lens for correcting a focus displacement when the filter member is inserted into the optical path of the optical system) and a correction coefficient corresponding to the aperture stop value (F number) of the aperture stop member. The correction coefficient corresponding to the aperture stop value (F number) results in a correction coefficient corresponding to the area occupied by the filter member for the opening diameter of each aperture stop value because the filter member is integrally provided for the aperture stop vanes. Furthermore, these correction value and correction coefficient are previously stored in a memory and the control device reads these pieces of information from the memory to obtain a correction amount.

Furthermore, the present invention provides an optical apparatus comprising an optical system provided with a focus lens such as a monofocal lens, an image taking device for image taking an optical image supplied from the optical system, a focus actuator for driving the focus lens, a focus position detecting device for detecting the position of the focus lens, an aperture stop member whose opening diameter is changed so as to adjust the luminous energy passing through the optical system, a filter member which can be freely inserted into or extracted from the optical path of the optical system so that the insertion state continuously changes to the optical path, an aperture stop state detecting device for detecting the opening state of the aperture stop member, a filter state detecting device for detecting the insertion state of the filter member, and a control device for controlling driving of the focus lens so as to correct the position of the focus lens in accordance with an output of the aperture stop state detecting device and an output of the filter state detecting device.

Furthermore, the filter member is driven so that an insertion state is continuously changed to the optical path of the optical system and the filter member can be freely inserted into or extracted from the optical path.

In this case, the correction amount of the position of the focus lens is obtained from a preset correction value (movement correction amount of the focus lens for correcting a focus displacement when the filter member is inserted into the optical path of the optical system) and a correction coefficient corresponding to the covering amount (covering rate) of the filter at the aperture stop value (F number) of the aperture stop member (corresponding to the insertion rate of the filter into the optical path at the opening diameter of each aperture stop value). These correction value and correction coefficient are previously stored in a memory and the control device reads these pieces of information from the memory to obtain a correction amount.

Moreover, it is allowed that the above filter member uses a filter member which has a plurality of filters and into or from which one or more filters is or are selectively inserted or extracted or a filter member which has a plurality of filters having refraction indexes different from each other and into or from which one or more filters is or are selectively inserted or extracted. In this case, it is also allowed to previously store a correction coefficient corresponding to each filter in a memory, selectively detect insertion of a filter to be inserted into an optical path into the optical path by an optical sensor, magnetic sensor, or electric switch, and read a correction coefficient corresponding to the detected filter from the memory by a control device to obtain a correction amount.

The correction of movement information of the present invention (correction of the position of a focus in the case of a monofocal lens) is correction of the position of the above focus lens and a correction amount of the position (correction amount obtained from the above correction value and correction coefficient) X satisfies the following conditional expressions (1) to (3) when assuming the pixel pitch between image taking pixels as P, the F number of an aperture stop member as F No., the positional sensitivity of a focus lens corresponding to the zooming position of a zoom lens (positional sensitivity of a focus lens in the case of a monofocal lens) as fs, the thickness of a filter member on the optical axis as d, and the refraction index of the filter member as Nd.

$$0 < X < 10 \times P \times F\ No/fs \quad (1)$$

$$10 < d \times P/Nd < 40 \quad (2)$$

$$0 < P < 3.5\ \mu \quad (3)$$

The conditional expression (1) is an expression for specifying a correction amount. When a correction amount exceeds an upper limit value, focusing can be realized in accordance with the paraxial theory but a large aberration optically occurs and thereby, a preferable image cannot be obtained.

The conditional expression (2) is an expression for specifying the thickness of a filter. Though the expression (2) relates to the expression (1), it is not preferable to extremely thicken a filter because it is limited to correct the thickness and the optical performance is deteriorated. By performing a correction satisfying the above conditional expressions, it is possible to preferably correct a focus displacement caused by insertion of an optical member such as an ND filter and always obtain a high image quality. The conditional expression (3) shows the pitch between pixels of a CCD or CMOS serving as an image taking device.

A filter member of the present invention uses a neutral density filter (ND filter).

Moreover, it is allowed to use a filter member having a single transmission index (density) as the above filter member or apply a configuration in which a transmission index increases toward the center of the opening (density of a filter decreases toward the center of opening of aperture stop member or center of optical axis) of an aperture stop member for the above filter member. In this case, the luminous energy irregularity on a image taken screen is moderated. Thus, to effectively moderate the phenomenon of luminous energy irregularity, it is preferable that the density of a filter slowly changes toward the center of the opening (center of optical axis) of an aperture stop member.

Furthermore, it is allowed that the above filer member is formed by a multilayer film. To generate a density change by a filter, it is possible to form a filter member by using a multilayer film and controlling a density change freely to a certain extent and decrease the thickness of a filter (base transparent plate) required to generate a density. Thereby, the above mentioned is preferable because influences of the filter to be inserted into a image taking optical system decrease, deterioration of optical performances decrease, and the correction amount of a focus lens decreases. Furthermore, it is preferable to constitute the above multilayer film so as to have a layer for deteriorating reflection.

When a flat plate such as a filter is present in an image taking optical system, it causes a ghost or flare. Therefore, by forming the above filter into a multilayer film and thereby forming an antireflection film, it is possible to reduce ghosts and flares.

Furthermore, correction of a focus position caused by the above filter member is performed when the above corrected aperture stop value is present in a range between F No. 2.0 of the image taking optical system and an aperture stop closed state. The filter is inserted into the image taking optical system at an aperture stop value when an aperture stop is slightly closed from its opened state. However, to prevent the focusing performance from being deteriorated due to a diffraction phenomenon caused when the opening diameter of the aperture stop decreases, it is important to cover by the filter in a state of a slightly bright F No. Therefore, because the filter completely covers between F No. 2.0 and F No. 11.0 and thereafter, the completely covered state continues until the aperture stop closes. Therefore, by using a focus displacement caused during the above period as a correction amount of a focus lens, it is possible to construct a proper optical apparatus.

BRIEF DESCRIPTION OF THE DRAWINGS

FIG. 2A is a top view of the aperture stop unit in FIG. 1 and

FIG. 2B is an exploded perspective view of the aperture stop unit in FIG. 1;

FIG. 16 is a block diagram showing an optical apparatus of sixth embodiment of the present invention.

DESCRIPTION OF THE PREFERRED EMBODIMENTS

Details of an optical apparatus of the present invention are described below in accordance with embodiments shown in the accompanying drawings.

(First Embodiment)

Figure 1:
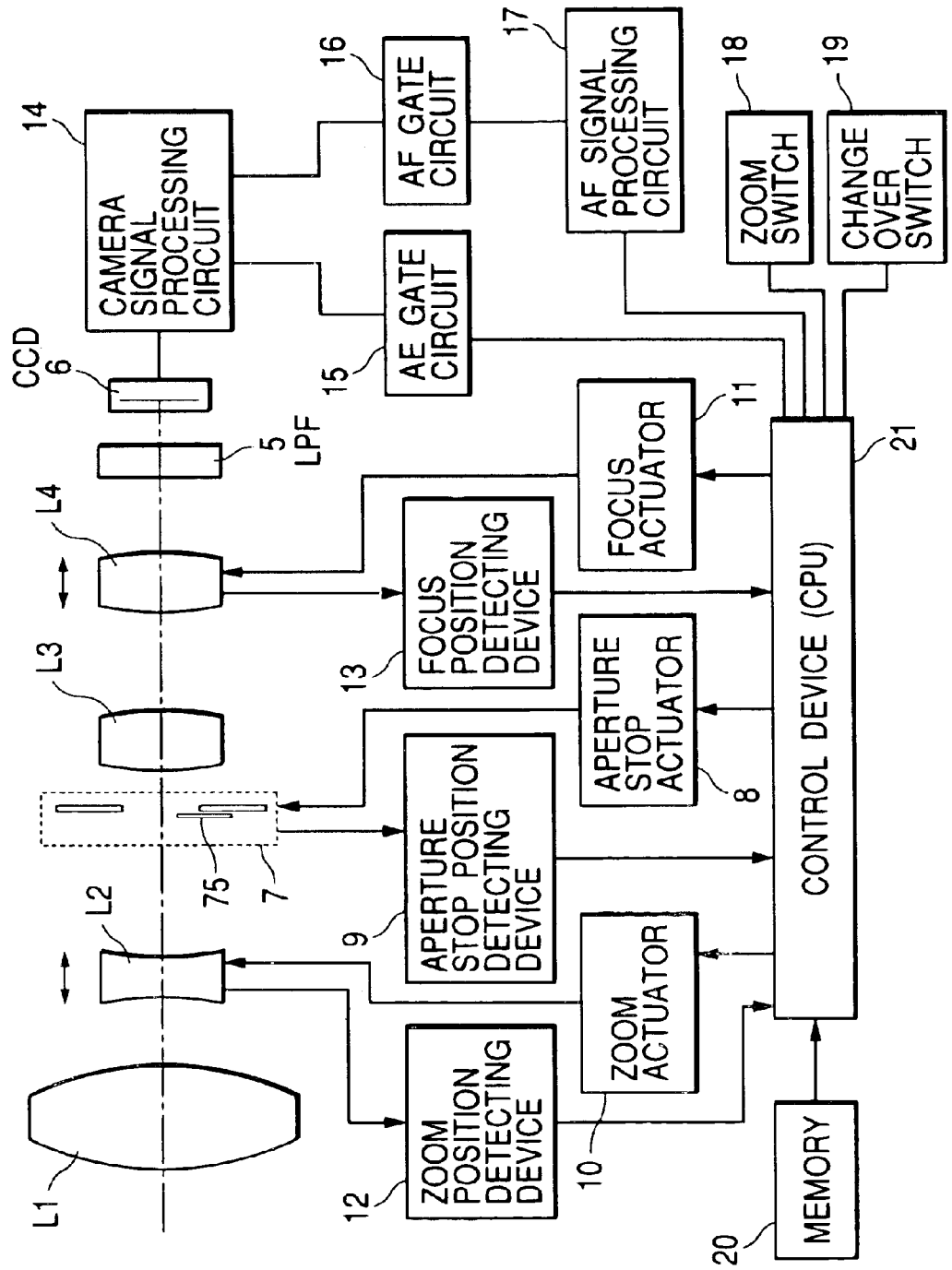
FIG. 1 is a block diagram showing an optical apparatus of first embodiment of the present invention.

FIG. 1 is a block diagram of an optical apparatus of first embodiment when applied to a video camera.

In FIG. 1, symbol L1 denotes a first group lens serving as a fixed convex lens, L2 denotes a concave variator lens for zooming (changing magnification of) an object, L3 denotes a third group lens serving as a fixed convex lens, L4 denotes a convex focus lens for correcting an image surface when zooming an object and adjusting a focus. An optical system is obtained by constituting a rear focus zoom lens (RFZ lens) by the above lenses. Symbol 5 denotes a low pass filter and 6 denotes a solid state image taking device such as a CCD or CMOS. The optical system of these RFZ lenses, members, and an aperture stop unit to be described later are housed in and held by a not illustrated fixed lens tube.

Symbol 7 denotes an aperture stop unit which is constituted by a galvanometer aperture stop actuator 8 for rotating a magnet rotor due to the voltage applied to the coil and an aperture stop position detecting device 9. The aperture stop position detecting device 9 is constituted so as to detect a relation between rotational positions of a rotor and a stator by setting a Hall element in a meter serving as an aperture stop actuator.

Symbol 10 denotes a zoom actuator for driving the variator lens L2 in the optical axis direction. The zoom actuator 10 is constituted by a DC motor, a gear string, and an output shaft forming a screw rotated by the gear string or by a stepping motor having an output shaft forming a screw. A screw member integrally set to a lens holding frame (variator lens) in the optical axis direction is engaged with the screw of the output shaft and the lens holding frame is moved in the optical axis direction in accordance with the rotation of the output shaft. Symbol 11 denotes a focus actuator for driving the focus lens L4 in the optical axis direction. The focus actuator 11 is constituted by a stepping motor having an output shaft forming a screw. A screw member integrally set to a lens holding frame (focus lens) in the optical axis direction is engaged with the screw of the output shaft and the lens holding frame is moved in the optical axis direction in accordance with the rotation of the output shaft.

Symbol 12 denotes a zoom position detecting device and 13 denotes a focus position detecting device. These detecting devices respectively detect absolute positions of the variator lens L2 and focus lens L4 in their optical axis directions. When using a DC motor as the zoom actuator 10, a volume or a magnetic absolute position encoder is used to control a position for driving a lens in accordance with an output of the absolute position encoder. Moreover, when using a stepping motor for the zoom actuator 10 and the focus actuator 11, a position for driving a lens holding frame is controlled by setting the lens holding frame to a reference position at the time of start and continuously counting the number of operation pulses to be input to the stepping motor. Furthermore, when using a linear actuator as the zoom actuator 10 and focus actuator 11 respectively, it is possible to detect the position of a lens holding frame by making a magnet with magnetized N and S poles and an MR sensor continuously output pulses.

Symbol 14 denotes a camera signal processing circuit to apply a predetermined amplification and gamma correction to an output of a CCD 6. A contrast signal of a video signal undergoing these predetermined processings passes through an AF gate circuits 15 and 16. That is, an optimum signal fetching range for exposure decision and focusing is set by gates of the circuits 15 and 16 in the whole screen.

Symbol 17 denotes an AF signal processing circuit for AF (autofocusing) to generate one or more outputs about the high frequency component of a vide signal. Symbol 18 denotes a zoom switch and 19 denotes an AF/MF (manual focusing) selection switch (switch for turning on/off autofocus mode). Symbol 20 denotes a memory. The memory 20 stores the information on a focus lens position corresponding to an object distance and a variator lens position for zoom (zoom tracking information). Moreover, the memory 20 previously stores not only the zoom, tracking information on an RFZ lens optical system but also the information on a correction value (correction amount) of the position of a focus lens corresponding to a focus displacement when an ND filter to be described later covers the optical path of an optical system (covers the opening of the aperture stop unit 7) and the information on a correction coefficient corresponding to the aperture stop value (F number) of the aperture stop unit (correction coefficient corresponding to the area covered by a filter member to the opening diameter of each aperture stop value because the filter member is integrally set to aperture stop vanes). It is also allowed to store the above zoom tracking information, correction value information, and correction coefficient information in another memory or use a memory in the control device (CPU) instead of the above memory.

Symbol 21 denotes a control device including a CPU (hereafter abbreviated as CPU). When the zoom switch 18 is operated by a photographer, the CPU 21 drives and controls the zoom actuator 10 and focus actuator 11 so that a predetermined positional relation between a variator lens and a focus lens is kept and the present absolute position of the variator lens in the optical axis direction serving as a detection result of the zoom position detecting device 12, the position (target position) at which the variator lens should be located calculated in accordance with the zoom tracking information in the memory 20, and the position (target position) at which the focus lens should be located calculated in accordance with the present absolute position of the focus lens in the optical axis direction serving as a detection result of the focus position detecting device 13 and the zoom tracking information in the memory 20 coincide with each other.

Moreover, when the CPU 21 determines that the changeover switch 19 is set to the autofocus mode, it drives and controls the focus actuator 11 so that an output of the AF signal processing circuit 17 shows a peak in the autofocusing.

Furthermore, the CPU 21 drives and controls the aperture stop actuator 8 so that a proper exposure is obtained and the average value of outputs of a Y signal passing through the AE gate circuit 15 becomes a predetermined value and changes the opening diameter of the aperture stop unit 7. The value of the opening diameter (aperture stop value) of the aperture stop unit 7 is detected by the aperture stop position detecting device 9 and its detection output is output to the CPU 21.

Then, the configuration of the aperture stop unit of an optical apparatus of the present invention is described below.

FIG. 2A is a top view for explaining the structure of the aperture stop unit 7 and FIG. 2B is an exploded perspective view of the aperture stop unit 7.

In FIGS. 2A and 2B, symbols 71 and 72 denote aperture stop vanes and oblong holes 71a, 71b, and 71c are formed on the vane 71. The oblong holes 71a and 71b on the vane 71 are engaged with bosses 73a and 73b formed on a bottom board 73 and the vane 71 is guided so that it can be linearly moved in the vertical direction in FIGS. 2A and 2B. Moreover, the oblong hole 71c is set to a size with which the boss 73c of the bottom board 73 does not interfere. oblong holes 72a, 72b, and 72c are formed on the vane 72. The oblong holes 72a and 72b on the vane 72 are engaged with bosses 73c and 73d formed on the bottom board 73 and the vane 72 is guided so that it can be linearly moved in the vertical direction in FIGS. 2A and 2B. Moreover, the oblong hole 72c is set to a size with which the boss 73a of the bottom board 73 does not interfere.

Symbol 81 denotes a meter section constituting the actuator 8 and aperture stop detecting device 9. Symbol 74 denotes an arm rocking integrally with an output shaft 82a of a magnet rotor set in the meter 81. Bosses 74a and 74b of the arm 74 are engaged with oblong holes 71d and 72d of the aperture stop vanes 71 and 72. The vanes 71 and 72 are constituted so that they are moved by each other in accordance with rocking of the arm 74 to change the area of the opening formed by two vanes 71 and 72.

An DN filter 75 is bonded to the vane 71 and set so as to cover the whole opening at a predetermined aperture stop value. Symbol 76 denotes a lid member for preventing the aperture stop vanes 71 and 72 from being removed and making it possible to smoothly move at a predetermined position.

Figure 3:
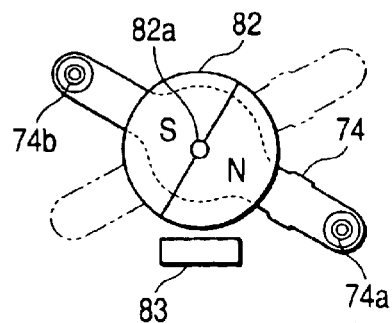
FIG. 3 is a top view for explaining position detection by the aperture stop unit in FIG. 1.

FIG. 3 is a top view of a meter section showing a configuration of the aperture stop actuator 8 and aperture stop detecting device 9. The aperture stop actuator 8 is constituted by a coil (not illustrated) and a magnet rotor 82 to rock the magnet rotor 82 in accordance with the publicly known magnetic action and the vanes 71 and 72 are driven by the integrally set arm 74. Moreover, the aperture stop position detecting device 9 is constituted by a Hall element 83 set in the meter 81 same as the magnet rotor 82 so as to detect the magnetic force of the magnet rotor 82 from release of the vanes 71 and 72 up to full closing of them by the Hall element 83 and output an almost linear voltage proportional to the rotation angle of the rotor. Furthermore, the device 9 is constituted so that the present aperture stop value of the aperture stop unit 7 is detected in accordance with the output of the voltage.

Then, the control for performing focus adjustment of an optical apparatus of the present invention by the above configuration is described below.

Figure 4:
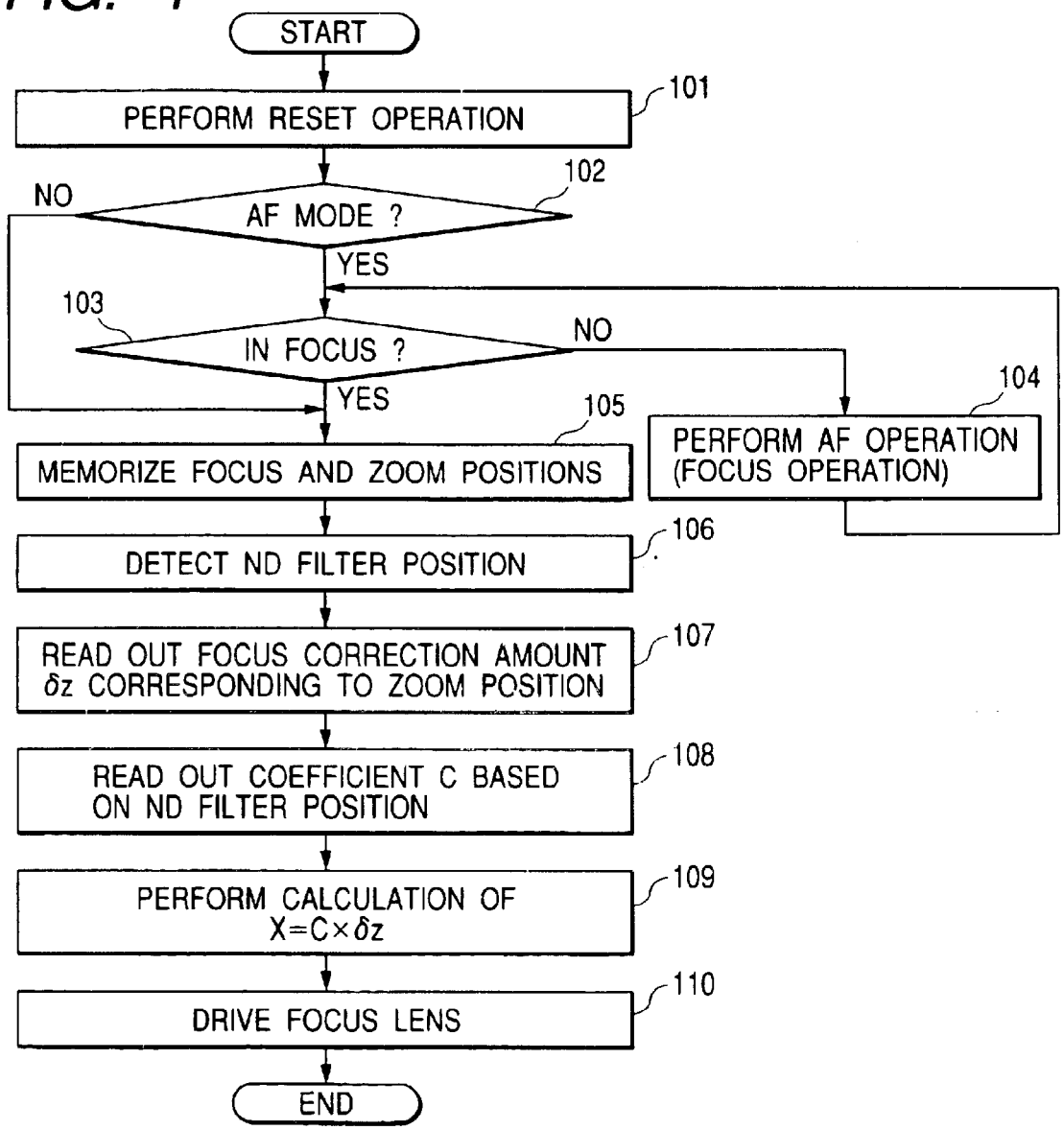
FIG. 4 is a flowchart for explaining control operations of the first embodiment.

FIG. 4 shows a flowchart for explaining the control of the control device (CPU) 21 for detecting insertion of an ND filter into an optical path and performing focus adjustment.

In FIG. 4, when power is first supplied to a camera, focus, zoom, and aperture stop are reset and a focus lens and zoom lens are respectively driven to the initial position. Moreover, in the case of the aperture stop, offset adjustment of the gain of a Hall output is performed in the full open state and full close state and standardized (step 101). Then, it is detected whether the autofocus mode is set (step 102). When the present mode is the autofocus mode, it is detected whether the present state is a focused state (103). When it is determined that a focused state is not set, a focus lens is driven until an object is focused (step 104). When it is determined in step 102 that a manual focus mode is set or in step 103 that an object is focused, positions of the focus lens and zoom lens are stored (step 105).

However, as described above, when AE control works depending on the brightness detected by a CCD and an aperture stop unit is driven so that a proper exposure is obtained or when the aperture stop unit is manually operated, the aperture stop value of an opening is detected as an output of a Hall element built in the unit and at the same time, the position of an ND filter integrally set to vanes is detected (step 106).

Then, the information on the focus correction amount of the focus lens is read from the memory 20 in accordance with the zoom position information detected in step 105 (step 107).

Then, a focus displacement correction amount is described below by referring to FIGS. 5A and 5B.

Figure 5A:
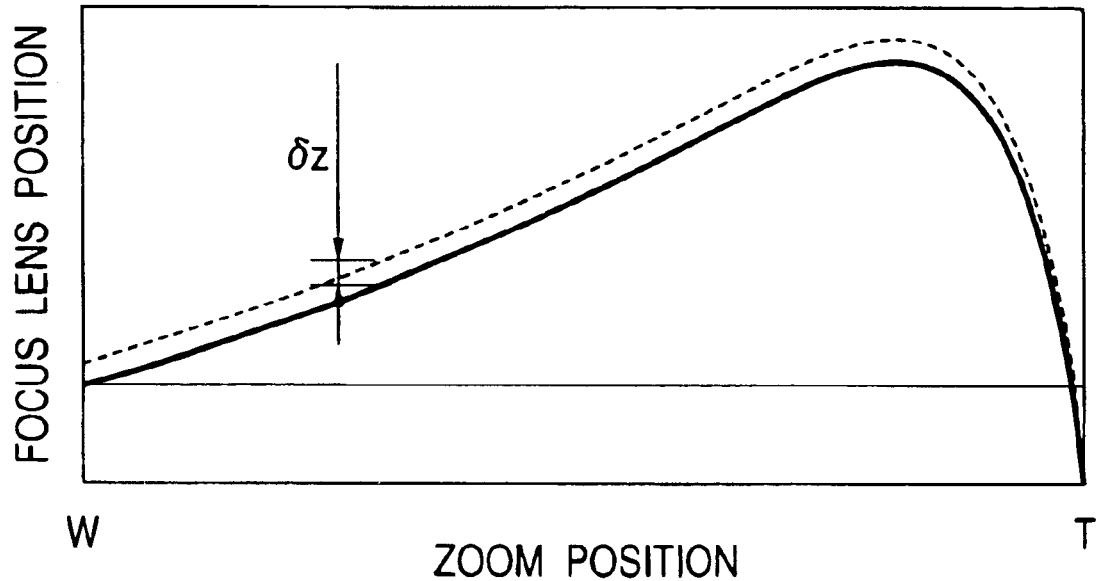
FIG. 5A is an illustration for explaining a focus correction amount corresponding to a zoom position and FIG. 5B is an illustration for explaining a focus correction amount corresponding to each divided zoom position.

FIG. 5A is a graph showing the focused position (delivery amount) of a focus lens by changing a zoom position (of zoom lens) when keeping an object distance constant. The curve in FIG. 5A is a curve when an object is present at an infinitely far position. The memory 20 stores a plurality of curves same about a plurality of object distances (from infinitely far distance to very close distance) in order to drive a focus lens in accordance with a curve corresponding to each object distance for zooming.

In FIG. 5A, the continuous line shows a state in which an ND filter is not present in an optical path and the dotted line shows the focused position of a focus lens when the ND filter completely covers the optical path. The memory 20 stores a correction amount corresponding to a zoom position, that is, the information on the amount of $\delta z$ shown in FIG. 5A.

Figure 5B:
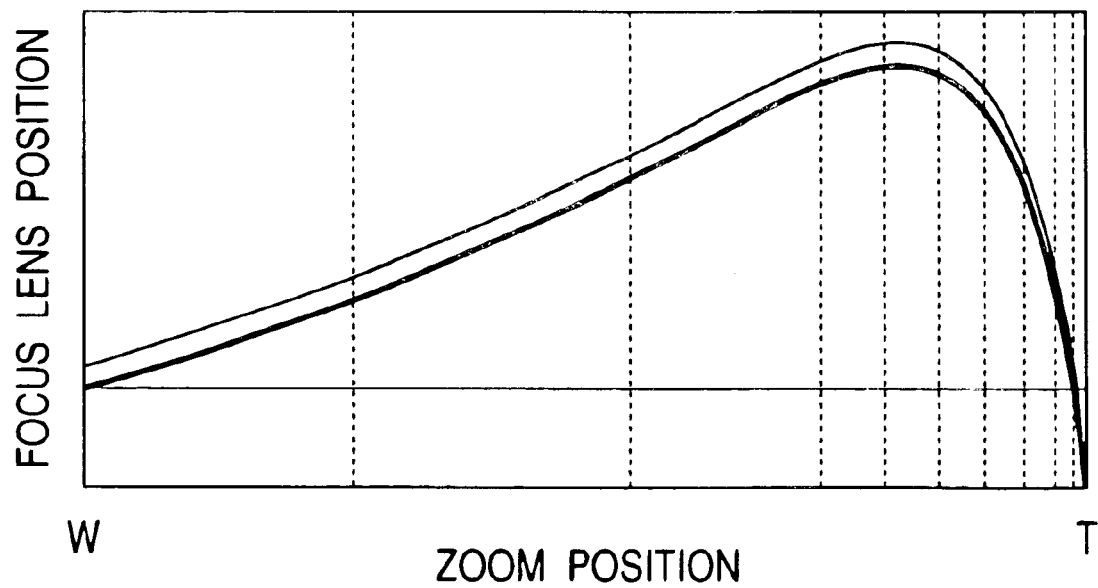

Also in FIG. 5B, the continuous line shows a state in which an ND filter is not present in an optical path and the dotted line shows the focused position of a focus lens when the ND filter completely covers the optical path, in which the line is divided every region in which a correction amount is not changed at a plurality of typical zoom positions (magnification changing positions of magnification changing lens) and the amount of $\delta z$ is stored in accordance with these number of divisions. A medium value between regions is calculated so as to be interpolated by values before and after it.

Moreover, the value of $\delta z$ depends on an object distance (curve showing infinitely far to very close distances). However, because the change of the value is sufficiently small compared to the change due to zoom positions, the same value is used at the same zoom position independently of an object distance in order to reduce data amount because of the restriction on a memory capacity. When a sufficient memory capacity is secured, it is allowed to decide a correction amount by using not only a zoom position but also a focus position as parameters.

Furthermore, a relation between focus correction amount and aperture stop opening diameter is described below.

Figure 6:
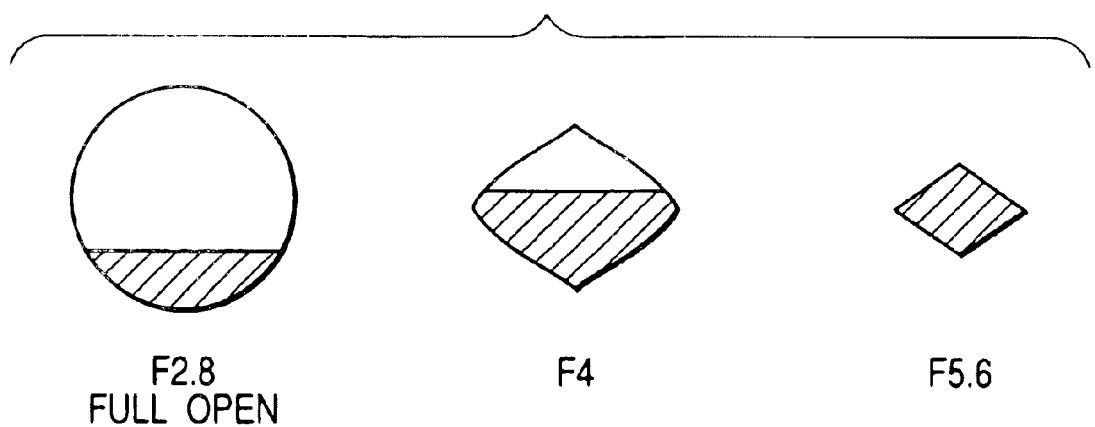
FIG. 6 is an illustration for explaining a relation between aperture stop opening and ND filter.
Figure 7:
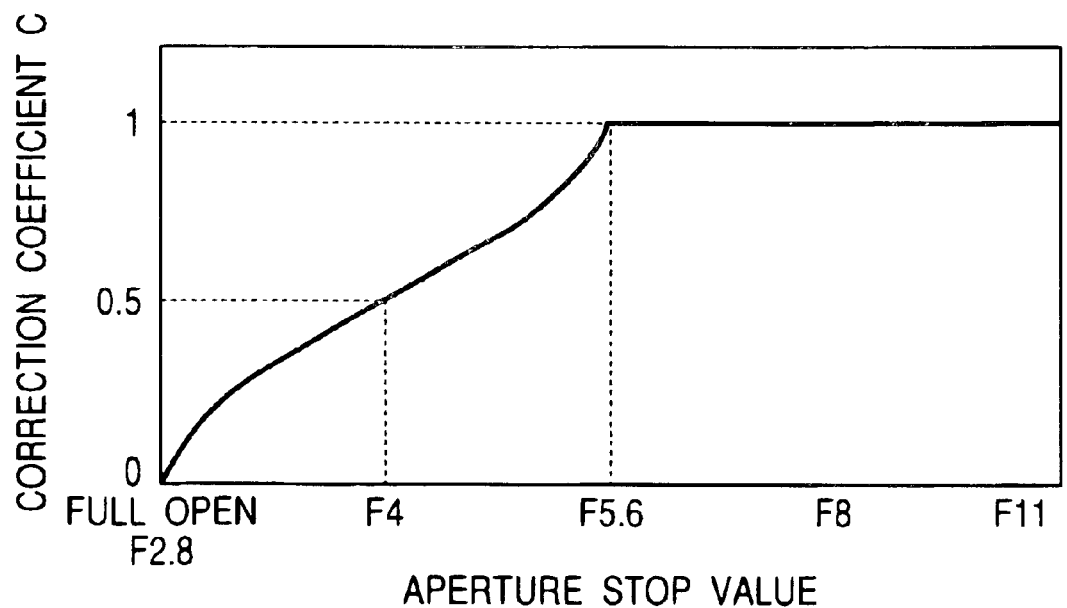
FIG. 7 is an illustration for explaining a relation between aperture stop value and correction coefficient.

FIG. 6 is an illustration showing ND filter covering states due to the change of an aperture stop opening and a part of the ND filter 75 enters an optical path even in an open state. Moreover, the rate for an ND filter to cover an opening area increases as the opening becomes smaller and the filter completely covers the opening at approx. F 5.6. FIG. 7 is a graph showing the rate of the area covered with an ND filter in an opening area, in which the axis of abscissa denotes aperture stop value and the axis of coordinate denotes correction coefficient c. The correction coefficient c is set so that it becomes zero for open state and becomes 1 when an ND completely covers an optical path. The information on these correction coefficients c is previously stored in the memory 20.

In the flowchart in FIG. 4, step 107 and subsequent steps are described. In step 107, the information on a focus correction amount of a focus lens is read from the memory 20 and then, a value of c is read from the memory 20 as a correction coefficient corresponding to the then aperture stop value in accordance with an output signal (aperture stop value: F number) of the aperture stop position detecting device 9 showing the position of an ND filter (step 108). In the case of this embodiment, because an optical path is completely covered at approx. F 5.6, the range from the open state up to F 5.6 is approximated by a straight line and c is equally set to 1 at narrower than F 5.6.

Moreover, the moving distance X of a focus lens considering the covering amount of an ND filter is computed as a value obtained by multiplying a correction amount $\delta z$ by a correction coefficient c (step 109). Thereafter, the focus lens is driven by a value equivalent to the moving distance X obtained in step 109 to perform focus correction (step 110).

Also when the ND filter continuously moves from the inside to the outside of the optical path, a correction amount is calculated similarly to the above description to perform focus correction by driving the focus lens in the direction opposite to the case in which the ND filter enters. Thus, it is possible to perform focusing more quickly. Moreover, when zooming is started with the state in step 110, the moving distance X of the focus lens is obtained by multiplying the correction amount $\delta z$ every zoom position by the correction coefficient c to correct the position of the focus lens. Operations between steps 102 and 110 are repeated and when an aperture stop value is changed in accordance with a luminous energy change, the position of the focus lens is corrected in accordance with the change of the aperture stop value.

Furthermore, a focused state is always kept without causing a focus displacement by detecting an aperture stop value showing the position of the ND filter also at the time of manual focusing and similarly driving the focus lens.

In the case of the above embodiment, it is possible to obtain a high quality image always keeping a focused state by obtaining a correction amount of a focus lens for correcting a focus displacement due to entrance of an ND filter from a correction value corresponding to the zoom position (magnification changing position) of a zoom lens and a correction coefficient corresponding to the area of a filter member covering the opening diameter of each of aperture stop values of aperture stop vanes integrated with the ND filter and correcting the position of the focus lens in accordance with the obtained correction amount.

Moreover, in the case of the above embodiment, the position of a focus lens is corrected so as to correct a focus displacement due to a filter member even in the autofocus mode. Thus, it is possible to keep a focused state even when a contrast signal for autofocusing is weak and an AF accuracy is not improved and set a focused state in a short time more securely than the case of performing autofocusing.

Thus, in the case of the above embodiment, it is possible to prevent a focus from being changed due to insertion or extraction of a filter in the manual focus mode and moreover increase the focusing speed even in the autofocus mode. Moreover, the above embodiment is effective even for the mode change for changing an aperture stop diameter like in the case of changing auto exposure image taking mode to the portrait mode.

(Second Embodiment)

Figure 8:
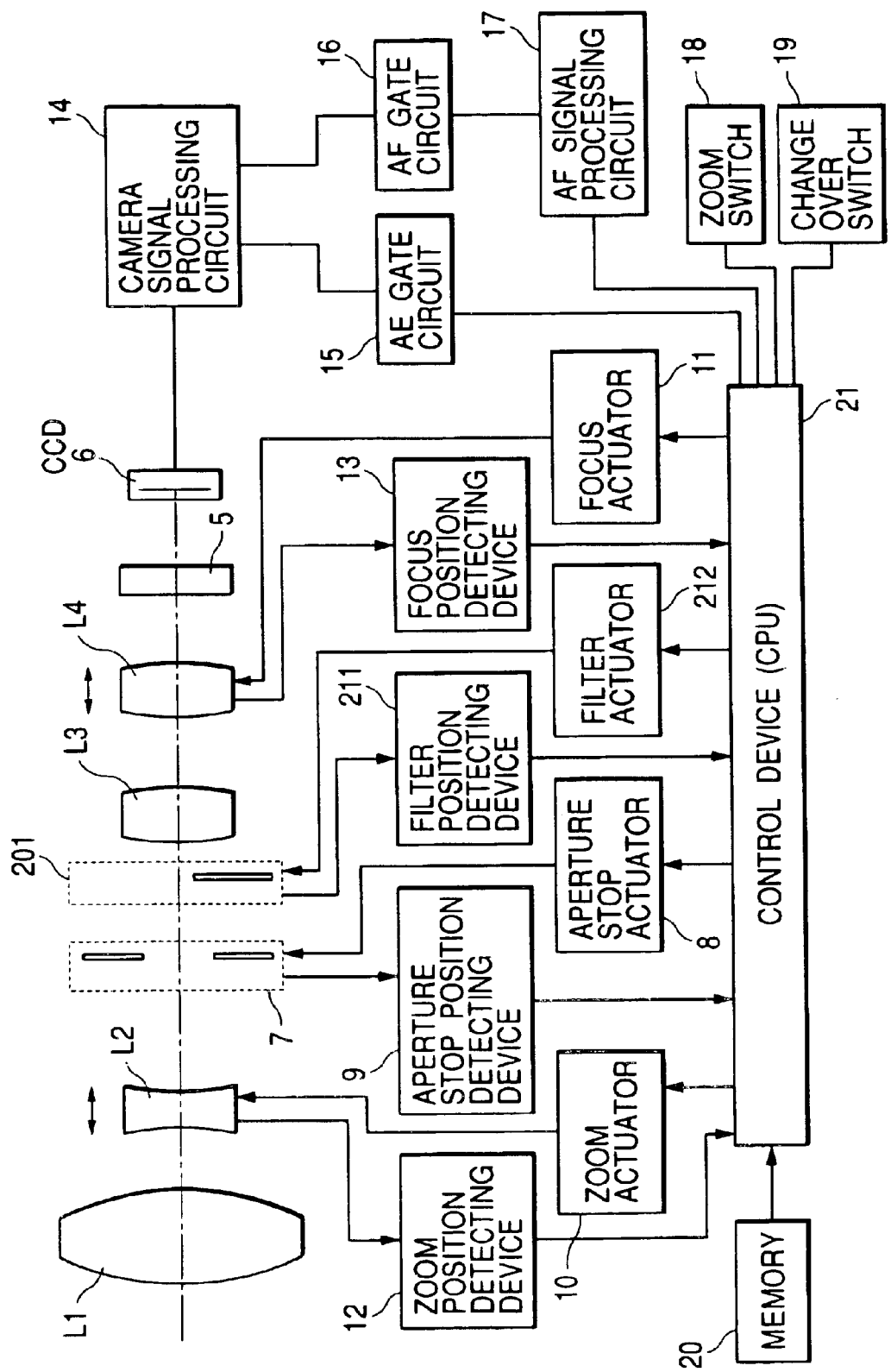
FIG. 8 is a block diagram showing an optical apparatus of second embodiment of the present invention.

FIG. 8 shows second embodiment of an optical apparatus of the present invention, which is a block diagram when applying the optical apparatus to a video camera and a member common to that in FIG. 1 is provided with the same symbol to omit duplicate description. This embodiment makes it possible to independently drive an ND driving unit 201 having an ND filter by a filter actuator 212 separately from an aperture stop unit 7 by setting the unit 201 after the unit 7 (image surface side of an optical system). In FIG. 8, symbol 211 denotes a position detecting device for detecting the entrance amount (position) of the ND filter (ND filter 204 shown in FIG. 9) into the optical path of the optical system, which is constituted by, for example, a Hall element.

The ND filter is driven and controlled so as to enter the optical path by detecting luminous energy and relating the luminous energy to an aperture stop value so as not to be influenced by diffraction when the aperture stop opening diameter of the aperture stop unit 7 becomes too small under automode image taking. The control device (CPU) 21 connects with a filter operating switch (not illustrated) and a photographer can optionally insert or extract the ND filter 204 into or from the optical path in accordance with his intention by operating the filter operating switch. Thereby, it is possible to control an out of focus taste by inserting the ND filter in accordance with the intention of the photographer and increasing the opening diameter of an aperture stop. Moreover, the memory 20 previously stores not only the information explained for FIG. 1 but also the information on the aperture stop value (F number) of the aperture stop unit 7 and the correction coefficient c corresponding to the filter insertion amount (insertion rate) at each aperture stop value (corresponding to the insertion rate of the filter into the optical path at the opening diameter of each aperture stop value).

When driving the ND filter independently of the aperture stop unit 7, the ND filter does not frequently become a state in which the filter covers up to the middle of opening. However, it is necessary to slowly move the ND filter in order to prevent a sudden brightness change of an image presently taken. The configuration of this embodiment becomes effective in order to correct a focus displacement in the above case.

Figure 9:
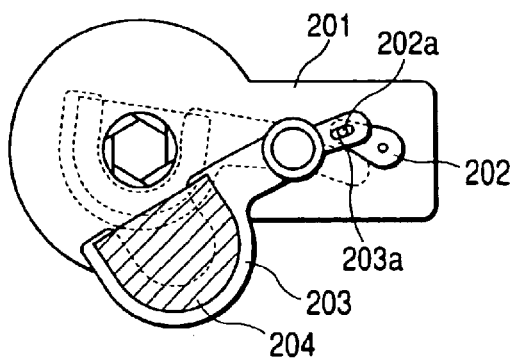
FIG. 9 is a top view showing the ND filter driving unit in FIG. 8.

FIG. 9 shows a top view of the above ND driving unit 201 which is set immediately after an aperture stop. The filter actuator 212 (shown in FIG. 8) is constituted by a galvanometer. An arm 202 rotating integrally with the magnet rotor (not illustrated) of the filter actuator 212 is set to the magnet rotor. The oblong hole 203a of an ND frame 203 is engaged with the boss 202a of the arm 202. The ND filter 204 is bonded to the ND frame 203. Moreover, the ND frame 203 is rotated in accordance with the rotation of the arm 202 and the ND filter 204 is inserted or extracted into or from the optical path. The entrance state (entrance amount) of the ND filter 204 is detected in accordance with an output of the Hall element serving as the filter position detecting device 211. Then, as described above, the ND filter is driven and controlled so as not to be influenced by diffraction when the aperture stop opening diameter of the aperture stop unit 7 becomes too small under auto mode photographing and the ND filter enters the optical path by detecting luminous energy and relating it to an aperture stop value. By operating the above filter operating switch, it is possible to optionally insert or extract the ND filter 204 into or from the optical path in accordance with the intention of a photographer.

Then, the control for performing focus adjustment of an optical apparatus of the present invention by the above configuration is described below.

Figure 10:
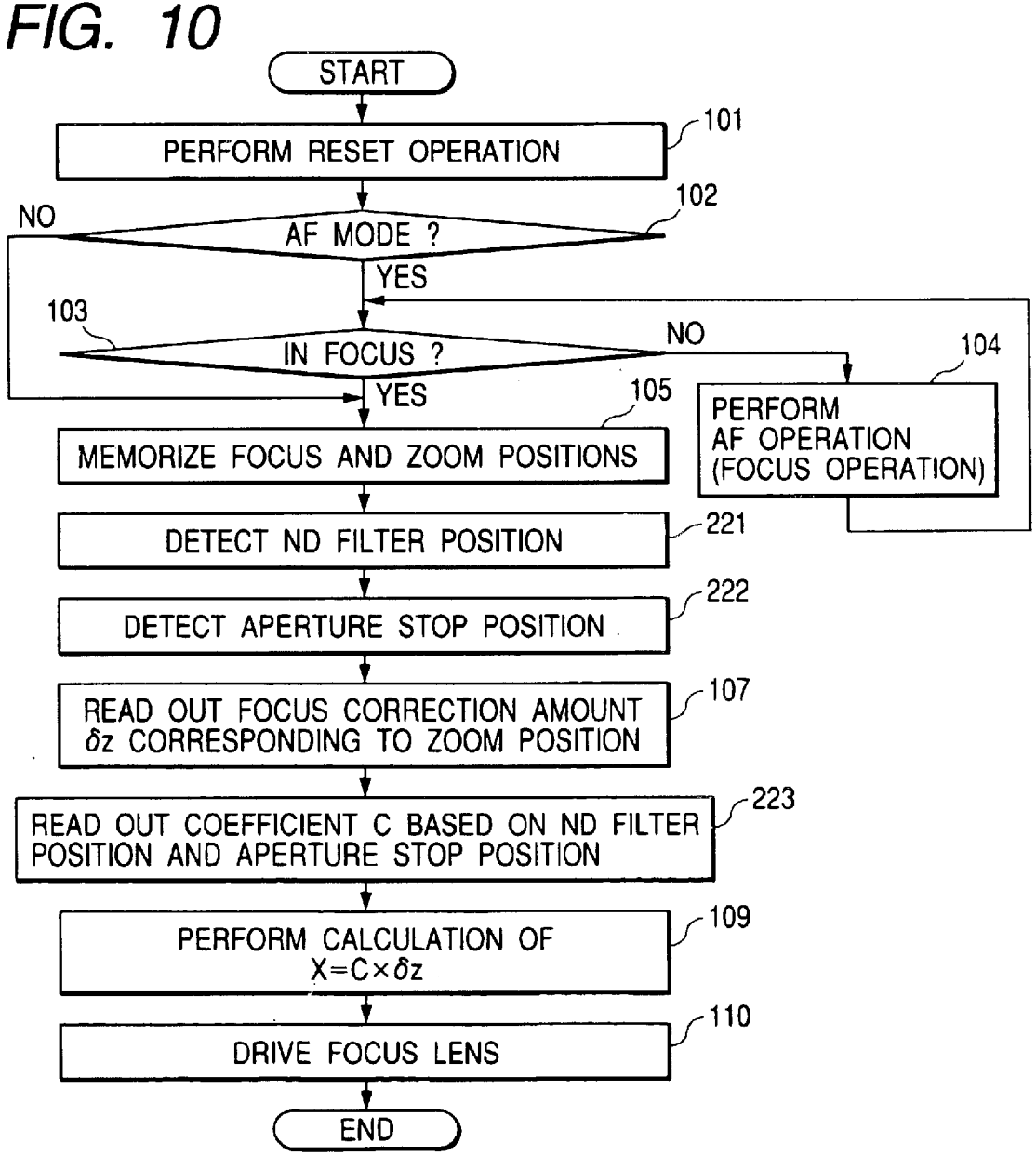
FIG. 10 is a flowchart for explaining control operations of the second embodiment.

FIG. 10 shows a flowchart of the control of the control device (CPU) 21 for detecting the aperture stop value of an aperture stop unit and entrance of an ND filter into an optical path and performing focus adjustment. Step same as step in the flowchart in FIG. 4 is provided with the same symbol.

In FIG. 10, when first turning on a camera, focus, zoom, and aperture stop are reset and a focus lens and zoom lens are driven to their initial positions. Moreover, in the case of the aperture stop, the offset of gains of Hall outputs in the full open state and the full close state is adjusted and standardized (step 101). Then, it is detected whether the present mode is an autofocus mode (step 102). When the present mode is the autofocus mode, it is detected whether the present state is a focused state (step 103). When it is determined that the present state is not the focused state, the focus lens is driven until the focused state is obtained (step 104). When it is determined in step 102 that the present mode is the manual focus mode and in step 103 that the present state is the focused state, positions of the focus lens and zoom lens are stored (step 105).

Then, the ND filter 204 is driven and controlled so as not to be influenced by diffraction when the aperture stop opening diameter of the aperture stop unit 7 becomes too small under auto mode image taking and the filter 204 enters the optical path by detecting luminous energy and relating the luminous energy to an aperture stop value or when the ND filter is driven with the intention of a photographer because a photographer operates a filter operating switch, the position of the ND filter (insertion amount of the aperture stop opening into the optical path) is detected in accordance with an output of the filter position detecting device 211 (step 221) and the then aperture stop value of the aperture stop unit 7 is detected in accordance with an output of the position detecting device 9 (step 222).

Then, the information on the focus correction amount of the focus lens is read from the memory 20 in accordance with the zoom position information detected in step 105 (step 107).

A focus displacement correction amount is described below by referring to FIGS. 5A and 5B.

FIG. 5A is a graph showing the focused position (delivery amount) of a focus lens when assuming that an object distance is constant by changing a zoom position (magnification changing position of magnification changing lens). The curve in FIG. 5A is a curve when an object is present at an infinitely far position but the memory 20 stores a plurality of curves same about a plurality of object distances (from infinite distance to very close distance) to drive a focus lens in accordance with a curve corresponding to each object distance for zooming.

In FIG. 5A, the continuous line shows a state in which an ND filter is not present in an optical path and the dotted line shows the focused position of a focus lens when the ND filter completely covers the optical path. The memory 20 stores a correction amount corresponding to a zoom position, that is, the information on the amount of δz shown in FIG. 5A.

Also in FIG. 5B, the continuous line shows a state in which an ND filter is not present in an optical path and the dotted line shows the focused position of a focus lens when the ND filter completely covers the optical path. Lines are divided every region in which correction amounts are not changed at a plurality of typical zoom positions (magnification changing positions of magnification changing lens) and the amount of δz is stored in accordance with the number of divisions of the lines. The medium value between regions is calculated so as to be interpolated with values before and after the medium value.

Moreover, the value of δz depends on an object distance (each curve between infinitely far position and very close position). However, because the change of an object distance is sufficiently smaller than the change of a zoom position, the same value is used at the same zoom position independently of an object distance in order to reduce the amount of data because of restrictions on a memory capacity. When a sufficient memory capacity is secured, it is also allowed to decide a correction amount by using not only a zoom position but also a focus position as parameters.

Furthermore, a relation between focus correction amount, aperture stop opening diameter, and entrance amount of ND filter is described below.

Figure 11:
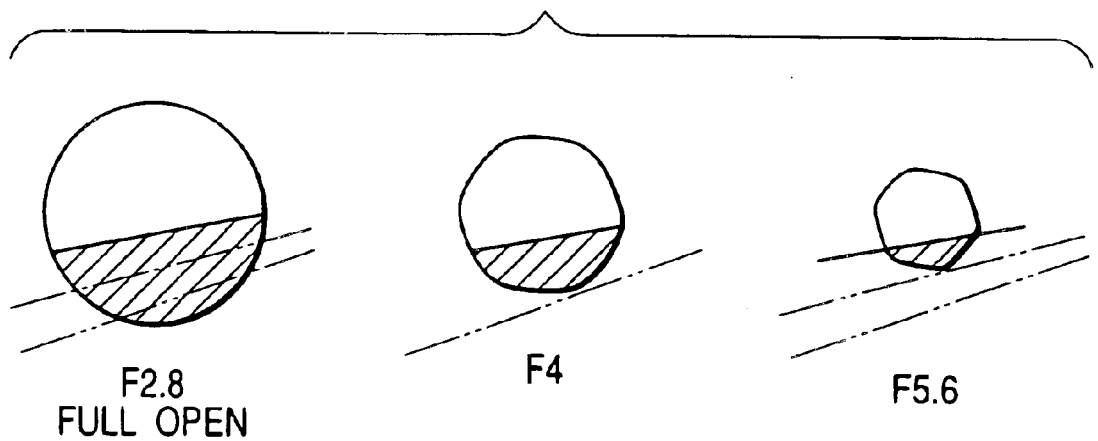
FIG. 11 is an illustration for explaining a relation between aperture stop opening and ND filter.

FIG. 11 is an illustration showing a relation between aperture stop opening shape and entrance amount of ND filter, in which an aperture stop opening is changed by keeping the entrance amount of the ND filter constant. It is found that the rate of the ND filter area in the full open area is changed in accordance with an aperture stop value even if the position of the ND filter is the same. The rate of the area covered with the ND filter slowly increases in the whole driving range of the ND filter nearby the full open state. It is found that ND does not cover the opening in the beginning nearby F 5.6 but it suddenly covers the whole opening after inserting the ND by a certain amount.

Figure 12:
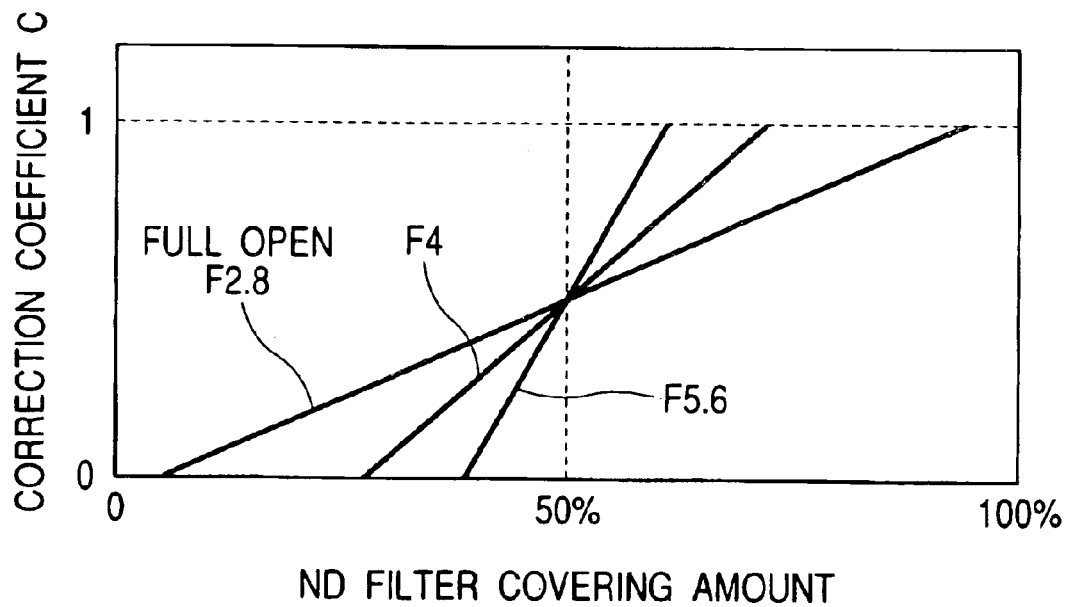
FIG. 12 is an illustration for explaining relations between filter covering amounts and correction coefficients at a plurality of aperture stop values.

FIG. 12 is a graph showing the rate of the area covered with an ND filter in the whole opening area to the opening diameter of an aperture stop unit, in which the axis of abscissa denotes ND filter covering amount (rate of area covered with ND filter in the whole opening area) and the axis of coordinate denotes correction coefficient c. In figure, a plurality of lines are designated for the principal aperture stop value. The correction coefficient is set so that it becomes 1 when ND completely covers an optical path by assuming the full open state as zero. The information on these correction coefficients c is previously stored in the memory 20.

In the flowchart in FIG. 10, step 107 and subsequent steps are described. In step 107, the information on focus correction amount of a focus lens is read from the memory 20 and the then aperture stop value and the value of c as a correction coefficient corresponding to the position of an ND filter are read from the memory 20 in accordance with a signal (aperture stop value: F number) of the position detecting device 9 showing the position (aperture stop value) of the aperture stop unit 7 and an output of the position detecting device 211 showing the position of the ND filter (step 223).

Then, the moving distance X of a focus lens considering the covering amount of the ND filter is computed as an amount obtained by multiplying the correction amount δz by the correction coefficient c (step 109). Then, the focus lens is moved by the moving distance X obtained in step 109 to perform focus correction (step 110).

Also when the ND filter continuously moves from the inside to the outside of the optical path, focus correction is performed by calculating a correction amount similarly to the above description and driving the focus lens in the direction opposite to the case in which the ND filter enters. Thus, it is possible to more quickly execute focusing. Moreover, when zooming is performed from the state in step 110, the moving distance X of the focus lens is obtained by multiplying the correction amount δz every zoom position by the correction coefficient c to correct the position of the focus lens. Operations between the above steps 102 and 110 are repeated. For example, when the entrance amount of the ND filter is changed correspondingly to the change of luminous energy, the position of the focus lens is corrected in accordance with the change of entrance amount of ND filter.

Moreover, a focused state is kept without causing a focus displacement also at the time of manual focusing by detecting an aperture stop value showing the position of the ND filter and similarly driving the focus lens.

The above embodiment makes it possible to obtain a high quality image keeping a focused state by obtaining a correction amount of a focus lens for correcting a focus displacement caused by entrance of an ND filter from a correction value corresponding to the zoom position of a zoom lens, the aperture stop value (F number) of an aperture stop member, and a correction coefficient corresponding to the insertion amount (insertion rate) of a filter at the aperture stop value (corresponding to the insertion rate of a filter into an optical path at the opening diameter of each aperture stop value) and correcting the position of the focus lens in accordance with the obtained correction amount.

Moreover, in the case of the above embodiment, the position of a focus lens is corrected so as to correct a focus displacement due to a filter member also in the autofocus mode.

In this case, it is possible to keep a focused state even when an AF accuracy cannot be improved because a contrast signal for autofocusing is weak and set a focused state in a short time more securely than the case of performing autofocusing.

Thus, in the case of this embodiment, it is possible to prevent a focus change due to insertion or extraction of a filter in the manual focus mode and moreover increase a focusing speed even in the autofocus mode. The embodiment is also effective for the mode change for changing an aperture stop diameter like the case of changing auto exposure image taking mode to the portrait mode.

Also in the manual focus mode, a focused state is kept without causing a focus displacement by detecting the position and aperture stop value of an ND filter and similarly driving a focus lens.

(Third Embodiment)

Figure 13A:
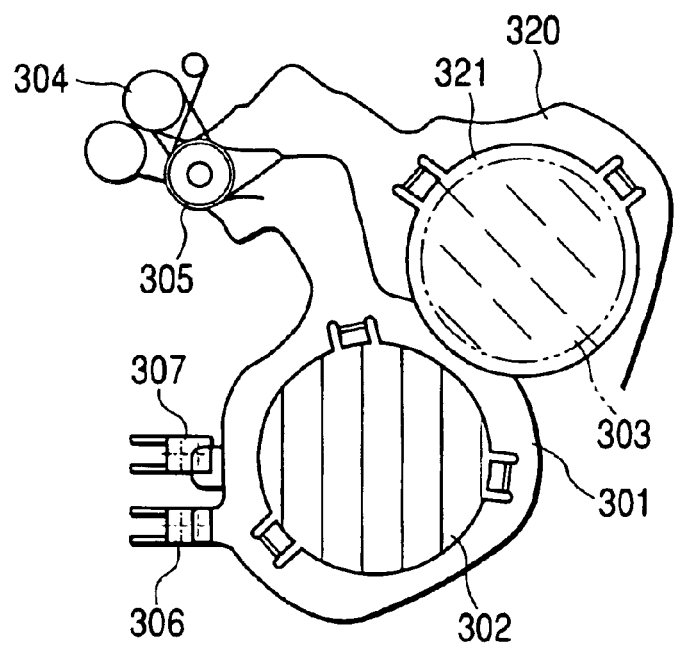
FIGS. 13A and 13B are illustrations respectively showing a filter driving unit of third embodiment.
Figure 13B:
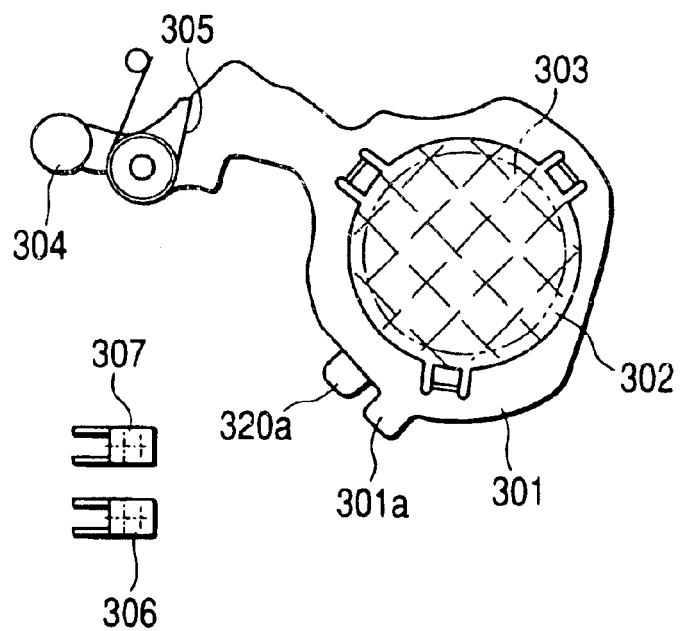

FIGS. 13A and 13B show third embodiment of an optical apparatus of the present invention, which serves as an ND filter change unit of another embodiment of the ND driving unit shown by the block diagram in FIG. 8. Therefore, configurations other than the configuration of the ND filter change unit are the same as those in FIG. 8. FIGS. 13A and 13B are top views of an ND filter change unit which can be manually operated. The ND filter change unit is constituted separately from an aperture stop unit, independently driven, and set to the rear (image surface side) of the aperture stop unit.

In FIGS. 13A and 13B, symbols 301 and 320 denote filter frames to which ND filters 302 and 321 are bonded and fixed. The ND filers 302 and 321 are constituted so as be inserted into an optical path at shifted positions on the optical path. It is allowed that these ND filters have the same density or different densities and thicknesses of the filters are equal to or different from each other. FIG. 13A shows a state in which the ND filter 321 is inserted into an optical path 303. By manually operating the operating section 304 of the filter frame 301 holding the ND filter 302 directly or through a connection member in the above state, the ND filters 321 and 302 completely cover the optical path 303 as shown in FIG. 13B. In this case, it is also allowed to realize a configuration so that the ND filter 321 is separated from the optical path 303 and the ND filter 302 covers the optical path 303. Symbol 305 denotes a spring which energizes each filter frame so as to move to the outside of the optical path. Positions of the ND filters 302 and 321 are detected by interrupters 306 and 307. When protruded portions 301*a* and 320*a* of the filter frames 301 and 320 enter the gap between the light emitting and receiving sections of the interrupters 306 and 307, electrical detection is performed and thereby, insertion states of the ND filters 302 and 321 into the optical path 303 are detected.

Then, in the case of this embodiment, the memory 20 described for the block diagram in FIG. 8 stores not only zoom tracking information but also the information on the correction value (correction amount) of the position of a focus lens corresponding to a focus displacement when each ND filter covers an image taking optical system every zoom position (when each ND filter covers the opening diameter of the aperture stop unit 7) correspondingly to each ND filter. Thereby, the position of the focus lens is corrected in accordance with the information on the correction value (correction amount) of the position of a corresponding focus lens correspondingly to the insertion state of each ND filter.

(Fourth Embodiment)

Figure 14A:
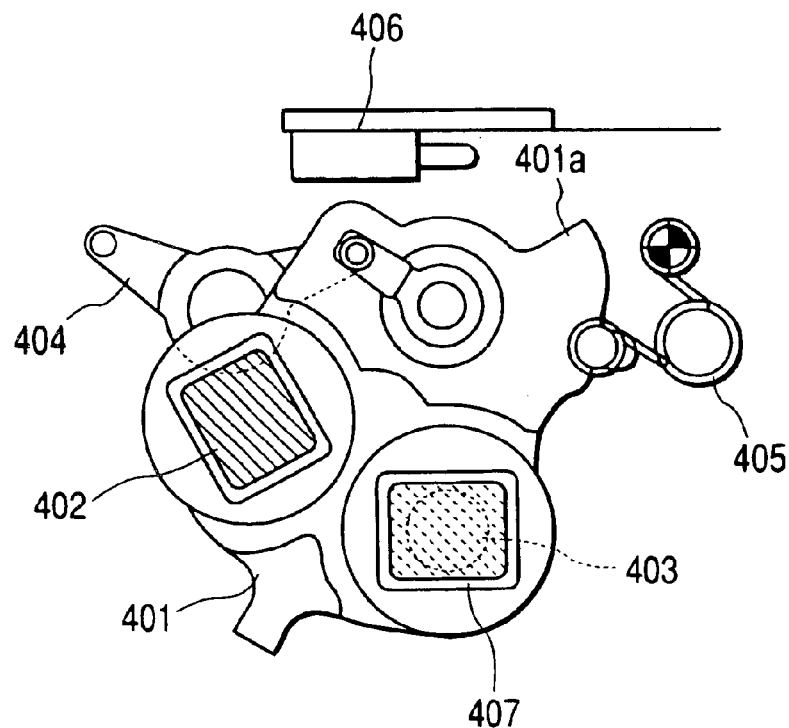
FIGS. 14A and 14B are illustrations respectively showing a filter driving unit of fourth embodiment.
Figure 14B:
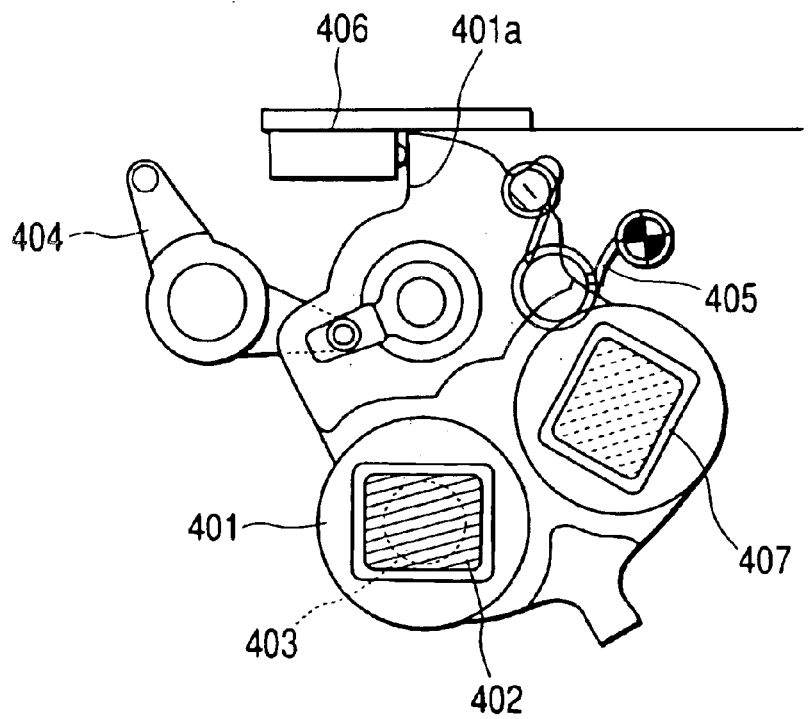

FIGS. 14A and 14B show fourth embodiment of an optical apparatus of the present invention. Though an ND filter is inserted into an optical axis at a shifted position on an optical path in the case of the third embodiment, the fourth embodiment is constituted so that each ND filter is inserted into an optical path at the same position on an optical axis. The fourth embodiment has the same configuration as that in FIG. 8 except the configuration of an ND filter change unit.

In FIGS. 14A and 14B, symbol 401 denotes a filter frame. Two ND filters 402 and 407 having thicknesses (refraction indexes) and densities (transmission indexes) different from each other are fixed to the filter frame 401. By operating an operating section 404 directly or through a connection member while the ND filter 407 is inserted into an optical path 403 as shown in FIG. 14A, the ND filter 407 is removed from the optical path 403 and the ND filter 402 is inserted into the optical path 403 as shown in FIG. 14B. In this case, a spring 405 energizes the ND filters 402 and 407 so that either of the filters is stabilized at the position of the optical path 403. The insertion state of the ND filter 402 or 407 into the optical path 403 is electrically detected when the pressing section 401a of the filter frame 401 operates a push switch 406.

Moreover, in the case of this embodiment, similarly to the case of the third embodiment, the memory 20 described for the block diagram in FIG. 8 previously stores not only the zoom tracking information but also the information on the correction value (correction amount) of the position of a focus lens corresponding to a focus displacement when each ND filter covers the optical path of a photographing optical system (covers the opening diameter of the aperture stop unit 7) correspondingly to each ND filter. Thereby, the position of a focus lens is corrected by using the information on the correction value (correction amount) of the position of a corresponding focus lens in accordance with the insertion state of each ND filter.

(Fifth Embodiment)

Then, fifth embodiment of the present invention is described below by referring to FIG. 15.

Figure 15:
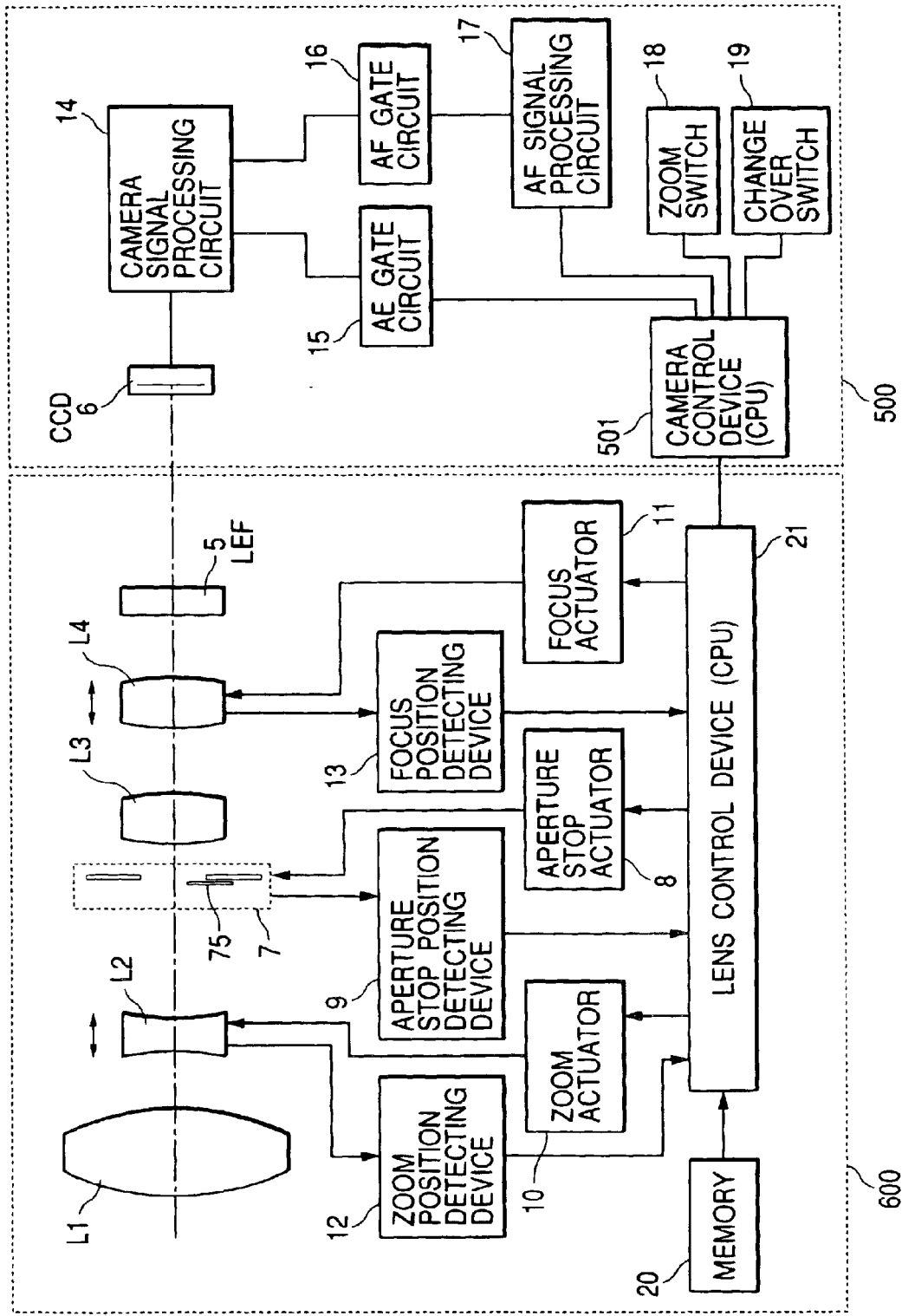
FIG. 15 is a block diagram showing an optical apparatus of fifth embodiment of the present invention.

FIG. 15 is a block diagram showing a video camera system constituted so that an interchangeable lens 600 can be freely set or removed to or from a camera (camera body) 500 serving as an optical apparatus. In FIG. 15, a portion common to that in FIG. 1 is provided with the same symbol and its duplicate description is omitted.

In FIG. 15, the camera 500 and interchangeable lens 600 can be freely set to or removed from a mount (not illustrated) and the camera CPU 501 and lens CPU 21 of the camera 500 are electrically connected each other by a communication terminal (not illustrated). The interchangeable lens 600 is provided with an aperture stop unit 7 in which an ND filter 75 is integrally fixed to an aperture stop vane.

Then, as in the first embodiment with FIGS. 1 and 4, also in the case of this embodiment, the correction amount of a focus lens for correcting a focus displacement caused by entrance of an ND filter is obtained from a correction value corresponding to the zoom position of a zoom lens and a correction coefficient corresponding to the area covered with a filter member to the opening diameter of each aperture stop value when the ND filter is integrally formed with an aperture vane to correct the position of the focus lens in accordance with the obtained correction amount. Thereby, it is possible to keep a focused state and obtain a high quality image.

(Sixth Embodiment)

Then, sixth embodiment of an optical apparatus of the present invention is described below by referring to FIG. 16.

FIG. 16 is a block diagram showing a video camera system constituted so that an interchangeable lens 800 can be freely inserted into or extracted from a camera (camera body) 700 serving as an optical apparatus. In FIG. 16, a portion common to that in FIG. 8 is provided with the same symbol and its duplicate description is omitted.

In FIG. 16, the camera 700 and interchangeable lens 800 can be freely set to or removed from a mount (not illustrated) and the camera CPU 701 and lens CPU 21 of the camera 700 are electrically connected each other by a communication terminal (not illustrated). The interchangeable lens 800 is provided with an ND driving unit 201 separately from the aperture stop unit 7.

Then, also in the case of this embodiment, similarly to the case of the second embodiment described for FIGS. 8 and 10, the correction amount of a focus lens for correcting a focus displacement caused by entrance of an ND filter is obtained from a correction value corresponding to the zoom position of a zoom lens, the aperture stop value (F number) of an aperture stop member, and a correction coefficient corresponding to the insertion amount (insertion rate) of the filter at the aperture stop value (corresponding to the insertion rate of the area of the filter in an optical path at the opening diameter of each aperture stop value) to correct the position of a focus lens in accordance with the obtained correction amount. Thereby, it is possible to obtain a high quality image keeping a focused state.

Also in the case of the fifth and sixth embodiments, in a case that ND filter is continuously removed from the inside to the outside of an optical path, focus correction is performed by calculating a correction amount similarly to the above description (FIGS. 4 and 10) and driving a focus lens in the direction opposite to the case of entrance of an ND filter also when the ND filter moves from the inside to the outside of the optical path. Thereby, it is possible to more quickly execute focusing. Moreover, when starting zooming with the state of correcting the position of the focus lens, the moving distance X of the focus lens is obtained by multiplying the correction amount δz every zoom position by the correction coefficient c to correct the position of the focus lens.

Moreover, at the time of manual focusing, a focused state is kept without causing a focus displacement by detecting an aperture stop value showing the position of an ND filter and similarly driving a focus lens.

In the case of the above embodiment, the position of a focus lens is corrected so as to correct a focus displacement due to a filter member also in the autofocus mode.

This makes it possible to keep a focused state even if a contrast signal for autofocusing is weak and an AF accuracy cannot be improved and set the focused state in a short time more securely than the case of performing autofocusing.

Thus, in the case of the above embodiment, it is possible not only to prevent a focus change due to insertion or extraction of a filter in the manual focus mode but also to increase the focusing speed even in the autofocus mode. Moreover, the above embodiment is effective for the mode change for changing an aperture stop diameter like the case of changing auto exposure image taking mode to the portrait mode.

Moreover, even at the time of manual focusing, a focused state is kept without causing a focus displacement by detecting the position and aperture stop value of an ND filter and similarly driving a focus lens.

In the case of the above embodiment, an optical apparatus using an RFZ lens optical system is described. However, the present invention is not restricted to the RFZ lens optical system but it can be also applied to an optical apparatus using a monofocal lens optical system (optical system having focus lens). The aperture stop member of the monofocal lens optical system is constituted by a plurality of aperture stop vanes so that an opening diameter (opening area) is changed by relatively moving the aperture stop vanes and a filter member is fixed to at least one of the aperture stop vanes. Moreover, it is preferable to realize a configuration so that the area covered with the filter member in an opening diameter is changed with relative movement of the plurality of aperture stop vanes. Furthermore, in this case, the correction amount of the position of the focus lens of the monofocal lens optical system for correcting a focus displacement due to insertion of the filter member into an optical path is obtained from a preset correction value (movement correction amount of focus lens for correcting focus displacement when filter member is inserted into optical path of monofocal lens optical system) and a correction coefficient corresponding to the aperture stop value of an aperture stop member.

The correction coefficient corresponding to the aperture stop value (F number) is a correction coefficient corresponding to the area covered with the filer member to the opening diameter of each aperture stop value since the filter member is integrally formed with the aperture stop vane. Moreover, it is allowed to realize a configuration in which a filter driving unit is set to the monofocal lens optical system separately from the aperture stop unit. The filter member is driven so that the insertion state of the member into the optical path of the optical system is continuously changed and it can be freely inserted into or extracted from the optical path. Moreover, the correction amount of the position of the focus lens for correcting a focus displacement due to insertion of the filter member into the optical path is obtained from a preset correction value (movement correction amount of focus lens for correcting focus displacement when filer member is inserted into optical path of optical system), the aperture stop value (F number) of the aperture stop member, and a correction coefficient corresponding to the insertion amount (insertion rate) of the filter at the aperture stop value (corresponding to insertion rate of filter in optical path at opening diameter of each aperture stop value).

For the above described embodiments, a case of a video camera is described as an optical apparatus. However, the present invention is not restricted to the video camera but it can be also applied to a digital still camera.

As described above, according to the above embodiments, the correction amount of a focus lens for correcting a focus displacement caused by entrance of a filter member is obtained from a correction value corresponding to the zoom position of a zoom lens (preset correction value in the case of monofocal lens) and a correction coefficient corresponding to the area covered with a filter member in the opening diameter of each aperture stop value when the filter member is integrally set to an aperture vane to correct the position of the focus lens in accordance with the obtained correction amount. Thus, it is possible to obtain a high quality image keeping a focused state.

Moreover, in the case of the above embodiments, the correction amount of a focus lens for correcting a focus displacement caused by entrance of a filter member is obtained from a correction value corresponding to the zoom position of a zoom lens (preset correction value in the case of monofocal lens), the aperture stop value (F number) of an aperture stop member, and a correction coefficient corresponding to the insertion amount (insertion rate) of a filter at the aperture stop value (corresponding to insertion rate of a filter in optical path at opening diameter of each aperture stop value) to correct the position of a focus lens in accordance with the obtained correction amount. Thus, it is possible to obtain a high quality image keeping a focus state.

Furthermore, in the case of the above embodiments, it is possible to keep a focused state even when an AF accuracy cannot be improved because a contrast signal for autofocusing is weak by correcting the position of a focus lens so as to correct a focus displacement due to a filter member also in the autofocus mode and set a focused state in a short time more securely than the case of performing autofocusing.

Furthermore, in the case of the above embodiments, it is possible to prevent a focus change due to insertion or extraction of a filer in the manual focus mode and increase the focusing speed even in the autofoucs mode. Moreover, the above embodiments are effective for the mode change for changing an aperture stop diameter like the case of changing auto exposure photographing to the portrait mode.

What is claimed is:

1. An optical apparatus comprising:
   an optical system provided with a variator lens movable along an optical axis and a focus lens movable along the optical axis, said variator lens varying a magnification of the optical system and said focus lens correcting a focus change due to the movement of said variator lens;
   an image taking device for taking an image supplied from the optical system;
   a zoom actuator for driving the variator lens;
   a focus actuator for driving the focus lens;
   a zoom position detecting device for detecting the position of the variator lens;
   a focus position detecting device for detecting the position of the focus lens;
   an aperture stop member having a plurality of movable vanes, said plurality of movable vanes changing a diameter of an opening of said aperture stop member to change a luminous energy passing through the optical system;
   a filter member integrally set to at least one of the movable vanes, for changing the luminous energy passing through the opening;
   an aperture stop state detecting device for detecting the opening state of the aperture stop member;
   a memory for storing information on the relation between the position of the variator lens and the position of the focus lens for keeping a focused state at the zooming; and
   a control device for correcting said information in accordance with an output of the aperture stop state detecting device and controlling driving of the focus lens by using said corrected information.

2. The optical apparatus according to claim 1, further comprising:
   a correction information memory storing a correction value corresponding to each position of the variator lens and a correction coefficient corresponding to each aperture stop value of the aperture stop member;

wherein the control device reads a corresponding correction value and correction coefficient from the correction information memory in accordance with an output of the zoom position detecting device and an output of the aperture stop state detecting device to correct said information by using the read correction value and correction coefficient.

3. The optical apparatus according to claim 1, wherein correction of said information is correction of the position of the focus lens, and when assuming the correction amount of the position of the focus lens as X, the correction amount X satisfies the following conditions by assuming the pixel pitch of an imaging device as P, F number of an aperture stop member as F No., position sensitivity of a focus lens corresponding to the position of the variator lens as fs, thickness of a filter member on the optical axis as d, and refraction index of the filter member as Nd;

$0<X<10\times P\times F\,No/fs$ $10<d\times P/Nd<40$ $0<P<3.5\,\mu.$

4. An optical apparatus comprising:

an optical system provided with a variator lens movable along an optical axis and a focus lens movable along the optical axis, said variator lens varying a magnification of the optical system and said focus lens correcting a focus change due to the movement of said variator lens;

an image taking device for taking an image supplied from the optical system;

a zoom actuator for driving the variator lens;

a focus actuator for driving the focus lens;

a zoom position detecting device for detecting the position of the variator lens;

a focus position detecting device for detecting the position of the focus lens;

an aperture stop member whose opening diameter changes so as to adjust the luminous energy passing through the optical system;

a filter member to be inserted into or extracted from the optical path of the optical system;

an aperture stop state detecting device for detecting the opening state of the aperture stop member;

a filter state detecting device for detecting the insertion state of the filter member;

a memory for storing the information on the relation between the position of the variator lens and the position of the focus lens for keeping a focused state at the time of the movement of the variator lens; and a control device for correcting said information in accordance with an output of the aperture state detecting device and an output of the filter state detecting device and driving the focus lens by using said corrected information.

5. The optical apparatus according to claim 4, further comprising:

a correction information memory storing a correction value corresponding to each position of the variator lens and a correction coefficient corresponding to the insertion amount of a filter member at each aperture stop value of the aperture stop member;

wherein the control device reads a corresponding correction value and a corresponding correction coefficient from the correction information memory in accordance with an output of the zoom position detecting device and outputs of the aperture stop state detecting device and the filter state detecting device and corrects said information by using the read correction value and correction coefficient.

6. The optical apparatus according to claim 4, wherein the filter member is driven so that the insertion state of the member is continuously changed to the optical path of the optical system and the member can be inserted into or extracted from the optical path.

7. The optical apparatus according to claim 4, wherein the filter member includes a plurality of filters, and one or more of the filters is or are selectively inserted or extracted.

8. The optical apparatus according to claim 4, wherein the filter member includes a plurality of filters having refraction indexes different from each other, and one or more of the filters is or are selectively inserted or extracted.

9. The optical apparatus according to claim 4, wherein the correction of said information is correction of the position of the focus lens, and when assuming the correction amount of the position of the focus lens as X, the correction amount X satisfies the following conditions by assuming the pixel pitch of the imaging taking device as P, F number of the aperture stop member as F No., position sensitivity of the focus lens corresponding to the position of the variator lens as fs, thickness of the filter member on an optical axis as d, and refraction indexes of the filter member as Nd;

$0<X<10\times P\times F\,No/fs$ $10<d\times P/Nd<40$ $0<P<3.5\,\mu.$

10. An optical apparatus comprising:

an optical system provided with a focus lens;

an image taking device for taking an image supplied from the optical system;

an actuator for driving the focus lens;

a position detecting device for detecting the position of the focus lens;

an aperture stop member having a plurality of movable vanes, said plurality of movable vanes changing a diameter of an opening of said aperture stop member to change a luminous energy passing through the optical system;

a filter member for changing the luminous energy passing through the opening, said filter member integrally setting to at least one of the aperture stop vanes;

a state detecting device for detecting the opening state of the aperture stop member; and a control device for controlling driving of the focus lens so as to correct the position of the focus lens in accordance with an output of the state detecting device.

11. The optical apparatus according to claim 10, further comprising:

a correction information memory storing a preset correction value and a correction coefficient corresponding to each aperture stop value of the aperture stop member;

wherein the control device reads the preset correction value and a corresponding correction coefficient from the correction information memory in accordance with an output of the aperture stop state detecting device and corrects the position of the focus lens by using the read correction value and correction coefficient.

12. The optical apparatus according to claim 10, wherein the correction of the movement information is correction of the position of the focus lens, and when assuming the correction amount of the position as X, the correction amount X satisfies the following conditions by assuming the pixel pitch of the image taking device as P, F number of the aperture stop member as F No., position sensitivity of a focus lens as fs, thickness of the filter member on an optical axis as d, and refraction index of the filter member as Nd;

$$0 < X < 10 \times P \times F\,No/fs$$

$$10 < d \times P/Nd < 40$$

$$0 < P < 3.5\,\mu.$$

13. An optical apparatus comprising:
an optical system provided with a focus lens;
an image taking device for image taking an image supplied from the optical system;
an actuator for driving the focus lens;
a position detecting device for detecting the position of the focus lens;
an aperture stop member whose opening diameter changes so as to adjust the luminous energy passing through the optical system;
a filter member to be inserted or extracted into or from the optical path of the optical system so that the insertion state of the member is continuously changed to the optical path;
a first state detecting device for detecting the opening state of the aperture stop member; and
a second state detecting device for detecting the insertion state of the filter member;
a control device for controlling driving of the focus lens so as to correct the position of the focus lens in accordance with outputs of the first and second state detecting devices.

14. The optical apparatus according to claim 13, further comprising:

a correction information memory storing a preset correction value and a correction coefficient corresponding to the insertion amount of a filter member at each aperture stop value of the aperture stop member;
wherein the control device reads the preset correction value and a corresponding correction coefficient from the correction information memory in accordance with outputs of the first and second state detecting devices and corrects the position of the focus lens by using the read correction value and correction coefficient.

15. The optical apparatus according to claim 13, wherein the filter member is driven so that the insertion state of the member continuously changes to the optical path of the optical system and the member can be freely inserted into or extracted from the optical path.

16. The optical apparatus according to claim 13, wherein the filter member includes a plurality of filters, and one or more of the filters is or are selectively inserted or extracted.

17. The optical apparatus according to claim 13, wherein the filter member includes a plurality of filters having refraction indexes different from each other, and one or more of the filters is or are selectively inserted or extracted.

18. The optical apparatus according to claim 13, wherein the correction of the movement information is correction of the position of the focus lens, and when assuming the correction amount of the position as X, the correction amount X satisfies the following conditions by assuming the pixel pitch of the image taking device as P, F number of an aperture stop member as F No., position sensitivity of the focus lens as fs, thickness of the filter member on an optical axis as d, and refraction index of the filter member as Nd;

$$0 < X < 10 \times P \times F\,No/fs$$

$$10 < d \times P/Nd < 40$$

$$0 < P < 3.5\,\mu.$$

* * * * *